United States Patent [19]
Ohta

[11] Patent Number: 5,909,414
[45] Date of Patent: Jun. 1, 1999

[54] OPTICAL INFORMATION RECORDING AND REPRODUCING APPARATUS HAVING A FUNCTION OF PREVENTING OVERWRITE RECORDING

[75] Inventor: Shinichi Ohta, Tokyo, Japan

[73] Assignee: Canon Kabushiki Kaisha, Tokyo, Japan

[21] Appl. No.: 08/897,144

[22] Filed: Jul. 21, 1997

Related U.S. Application Data

[63] Continuation of application No. 08/430,501, Apr. 28, 1995, abandoned.

[30] Foreign Application Priority Data

May 19, 1994 [JP] Japan .................................. 6-105387

[51] Int. Cl.$^6$ ...................................................... G11B 7/09
[52] U.S. Cl. ........................................ 369/44.33; 369/54
[58] Field of Search ............................ 369/44.28, 44.32, 369/44.33, 44.37, 44.38, 47, 50, 54, 58, 111; 235/454, 456

[56] References Cited

U.S. PATENT DOCUMENTS

| | | | |
|---|---|---|---|
| 4,669,072 | 5/1987 | Miura et al. | 369/54 X |
| 4,789,974 | 12/1988 | Satoh et al. | 369/54 X |

FOREIGN PATENT DOCUMENTS

| | | |
|---|---|---|
| 0184195 | 6/1986 | European Pat. Off. . |
| 0260637 | 3/1988 | European Pat. Off. . |
| 0286297 | 10/1988 | European Pat. Off. . |
| 2-166625 | 6/1990 | Japan . |

OTHER PUBLICATIONS

Patent Abstracts of Japan, vol. 013, No. 104, pub'd Mar. 13, 1989, English Abstract of Japanese Patent No. 63–282930.

Primary Examiner—W. R. Young
Attorney, Agent, or Firm—Fitzpatrick, Cella, Harper & Scinto

[57] ABSTRACT

An optical information recording apparatus for at least recording information by irradiating an optical information recording medium having a plurality of information tracks with at least one light beam. The apparatus includes a recorder for recording information on the recording medium with an information recording light beam and a plurality of detecting elements for detecting reflected light from the recording medium. Also provided is a high-frequency component detector for detecting a high-frequency component of a signal corresponding to an output signal from at least one of the plurality of detecting elements. Also provided is a controller for stopping recording of information by the recorder when the high-frequency component detector detects the high-frequency component during recording of information by the recorder.

9 Claims, 20 Drawing Sheets

OPTICAL INFORMATION RECORDING AND REPRODUCING APPARATUS HAVING A FUNCTION OF PREVENTING OVERWRITE RECORDING

This application is a continuation, of application Ser. No. 08/430,501 filed Apr. 28, 1995, now abandoned.

BACKGROUND OF THE INVENTION

1. Field of the Invention

This invention relates to an apparatus for optically recording or reproducing information and, more particularly, to an optical information recording and reproducing apparatus for preventing overwrite recording, i.e., preventing new information from being recorded over information already recorded.

2. Description of the Related Art

As conventional information recording systems for recording information in the form of digital signals, magnetic recording systems, optical recording systems and magneto-optical recording systems are known. Optical recording systems will be described below by way of example. Various types of recording media in the form of a disk, a card, a tape and the like are known as a medium on which information is optically recorded or from which information is read out. It is believed that a card-like recording medium (hereinafter referred to as an "optical card") will be extensively used because it can be manufactured easily and has good portability and accessibility.

Various optical information recording and reproducing apparatuses have been proposed for use with such an optical card. In each such apparatus heretofore proposed, information is recorded or reproduced while automatic tracking control and automatic focusing control are being continuously performed. Information is recorded on a recording medium in this kind of apparatus by scanning information tracks with a light beam modulated in accordance with the recorded information and condensed to form a very small light spot. Information is recorded as information bit strings which can be optically detected. Information is reproduced from the recording medium by scanning information bit strings in the information tracks with a light beam spot of a certain power such that no signal is recorded on the recording medium, and by detecting reflected light or transmitted light from the medium.

As typical examples of an optical system for optically recording and reproducing information in this manner, a single light source system and a multiple light source system are known. Examples of such light source systems will be described. A single light source system will first be described with reference to FIG. 1. Referring to FIG. 1, a beam of light emitted from a semiconductor laser device 101 is made parallel by a collimator lens 102 and is thereafter split into a plural light beams by a diffraction grating 103. The split light beams travel through a polarized beam splitter 104, a ¼ wavelength plate 105 and an objective lens 106 to be condensed on the surface of an optical card 107. Reflected light from the optical card 107 travels through the objective lens 106, the ¼ wavelength plate and the polarized beam splitter 108 and a toric lens 108 to be incident upon a light detecting device 109. Recording, reproduction and automatic focusing control (hereinafter referred to as "AF") are performed by using 0-order diffracted light in the light beams split by the diffraction grating 103, while automatic tracking control (hereinafter referred to as "AT") is performed by using ±1-order diffracted light. An astigmatism method is adopted to perform AF, while a three-beam method is adopted to perform AT.

FIG. 2(a) is a schematic plan view of the optical card 107 used in the above-described information recording and reproducing apparatus. A multiplicity of information tracks for recording and reproducing information are formed on the optical card 107 so as to extend parallel to each other. Only tracks T1, T2, and T3 among them are illustrated. These information tracks are separated by tracking tracks tt1 to tt4, which are formed by grooves in the card or by a material having a reflectivity different from that of the material of the tracks T1 to T3, and which are used as guides for obtaining a tracking signal. In FIG. 2(a), an example of recording of information in the track T3 or reproduction of information from this track is illustrated. A light spot 110 of ±0-order diffracted light for recording, reproduction and AF irradiates the track T3 while light spots 111 and 112 of ±1-order diffracted light irradiate to the tracking tracks tt3 and tt4.

A later-mentioned tracking error signal is obtained from reflected light from the light spots 111 and 112, and tracking control is performed on the basis of the tracking error signal so that the light spot 110 scans correctly along the track T3. The light spots 110, 111, and 112 are moved by an unillustrated mechanism so as to scan horizontally as viewed in FIG. 2(a) while being maintained in the same positional relationship, thereby recording or reproducing information. This scanning is accomplished by a method of moving the optical system or a method of moving the optical card. In either case, the optical system and the optical card make a relative reciprocating motion and, therefore, they are not moved at a constant speed near opposite ends of the optical card. FIG. 2(b) shows the speed of this relative motion. The abscissa of FIG. 2(b) represents the distance in the horizontal direction of the optical card while the ordinate represents the scanning speed. Ordinarily, a constant speed area at the center of the optical card 107 is used as a recording area. Thus, FIG. 2(b) shows a central recording section-constant speed area, and two reversing areas at both ends of the card where the light spots reverse their direction of travel by decelerating and then accelerating. Therefore, the reversing areas comprise acceleration/deceleration areas.

FIG. 3 is an enlarged illustration of a portion of the information track T3 and portions of the adjacent tracks shown in FIG. 2(a). The light spot 110 of 0-order diffracted light for AF is positioned at the center of track T3 between the ±1-order diffracted light for AT and scans the center line of the track T3. Hatched areas 113a, 113b, and 113c represent digital information recorded by a 0-order diffracted light spot 110a shown in FIG. 4. Such areas are generally called information pits. The information pits 113a, 113b, and 113c have a reflectivity different from that of the track portion surrounding them. Therefore, when the information pits are again scanned with the light spot 110 at a lower intensity than that at which they were recorded, reflected light of the light spot 110 is modulated at the pits 113a, 113b, and 113c to obtain a reproduction signal in accordance with recorded information.

FIG. 4 is a schematic diagram showing details of the light detecting device 109 shown in FIG. 1 and a signal processing circuit for processing output signals from the light detecting device 109 to form a reproduction signal and a servo error signal. The light detecting device 109 is constituted by six photosensors, i.e., 4-split photosensors 114 and photosensors 115 and 116. Light spots 110a, 111a, and 112a are formed by reflected light of the light spots 110, 111, and 112 projected onto sensing surfaces of these sensors. The light spot 110a is condensed on the 4-split photosensors, while the light spots 111a and 112a are condensed on the photosensors 115 and 116, respectively. Two sets of sensor outputs in diagonal directions of the 4-split photosensors 114 are respectively added by addition circuits 117 and 118, and addition outputs from these addition circuits are further added by an addition circuit 121 to output an information reproduction signal RF. That is, the information reproduction signal RF is a signal representing the total sum of detection signals obtained as detection output fragments from the 4-split photosensors 114. The outputs from the addition circuits 117 and 118 are subtracted from each other by a differential circuit 120 to output a focusing error signal Af. That is, the focusing error signal Af is a signal representing the difference between the sums in the diagonal directions of the 4-split photosensors 114. This astigmatism method will not be described because it is described in detail in published documents and because it is not directly related to the present invention. Outputs from the photosensors 115 and 116 are subtracted from each other by a differential circuit 119 to output a tracking error signal $A_{ts}$. Ordinarily, tracking control is performed in order to prevent deviation of the light spots from the information track by controlling the tracking system so that the tracking error signal $A_{ts}$. becomes zero.

That is, when the portions of the light spots 111 and 112 located on the tracking tracks tt3 and tt4 have the same area, the quantities of reflected light of these light spots received by the photosensors 115 and 116 are equal to each other. Accordingly, if the apparatus is controlled so that the tracking error signal $A_{ts}$ representing the difference between the outputs from the photosensors 115 and 116 becomes zero, then the light spot 110 of 0-order diffracted light scans the center of the information track T3, thus normally performing tracking control. In FIG. 4, a block 122 represents an addition circuit which adds the output signals from the photosensors 115 and 116 to output a tracking sum signal $A_{ta}$, as described below in detail. $T_{s1}$ denotes a received light signal from the photosensor 115, while $T_{s2}$ denotes a received light signal from the photosensor 116.

FIG. 5 is a diagram showing changes in the received light signals $T_{s1}$ and $T_{s2}$ from the photosensors 115 and 116 when the light spots 110 to 112 deviate to the left and right from the information track. The abscissa represents the deviation of the light spots from the center of the information track along the transverse direction perpendicular to the center line of the track, and the ordinate represents the quantity of light of the received light signals (light quantities) $T_{s1}$ and $T_{s2}$ from the photosensors 115 and 116. When the light spot 111 or 112 has no portion located on the tracking track tt3 or tt4, the received light signal $T_{s1}$ or $T_{s2}$ from the photosensor 115 or 116 is at a solid reflection level. When the area of the portion located on the tracking track is maximized, the received light signal is at a tracking track reflection level.

FIG. 6 is a diagram showing changes in the tracking error signal $A_{ts}$ when the light spots 110 to 112 deviate to the left and right from the information track. The abscissa represents the deviation of the light spots from the center of the information track along the transverse direction perpendicular to the center line of the track, and the ordinate represents the amplitude level of the voltage of the tracking error signal $A_{ts}$. When the light spot 110 is positioned at the center of the information track, the light quantities $T_{s1}$ and $T_{s2}$ are equal to each other and the value of the tracking error signal $A_{ts}$ is zero. The amplitude level of the tracking error signal $A_{ts}$ varies in plus and minus directions according to the directions of deviation of the light spots to the left and right. If the light spots 110 to 112 deviate in a direction perpendicular to the track to such a large extent that the light spots 111 and 112 have no portions located on the tracking tracks tt3 and tt4, then the signals $T_{s1}$ and $T_{s2}$ become equal to each other at the solid reflection level and the tracking error signal $A_{ts}$ also becomes zero. This state is established when the light spot 111 or 112 is at a position X1 or X2 of FIG. 6.

Referring again to FIG. 3, if the light spot 110 of 0-order diffracted light scans along different scanning loci at the times of recording and reproduction, that is, if tracking misalignment occurs, the contrast and the pit time interval of the information reproduction signal RF may vary to such an extent that the information cannot be reproduced. Such a situation may take place due to vibration of the apparatus, or dust or a scratch on the optical card 107. If different apparatuses are respectively used for recording and reproduction, such a situation may also occur due to a difference between the characteristics of the apparatuses. In particular, in the case of a single light source system such as that illustrated in FIG. 1, there is a possibility of information reproduction failure even when tracking misalignment between recording and reproduction is small, since the size of the light spot is constant during recording and reproduction. It can therefore be said that the tracking margin in single light source systems is disadvantageously small. Moreover, the powers of the light spots 110, 111, and 112 are largely changed during recording and non-recording times, and the light spots 110a, 111a, and 112a are also changed correspondingly to affect the AF control and the AT control.

A dual light source system is known in which the recording-reproducing tracking is increased in comparison with that in the single light source system to prevent power variation in the light detecting device. Details of such a dual light source system will be described. The operation on the optical card will first be described below with reference to FIG. 7. In a dual light source system, the three light spots of the single light source system are not used for recording information; rather a recording light spot 225 is separately provided. A light spot 226 for reproduction and AF control and light spots 227 and 228 for AT control correspond to the light spots 110, 111, and 112 shown in FIG. 3. The light spots 226, 227, and 228 are equal in size but the light spot 225 is smaller than the light spots 226, 227, and 228. FIG. 7 illustrates a situation where the track T3 is scanned with the light spot 225 in the direction of the arrow to record information. The light spot 226 moves ahead of the light spot 225.

The width of a pit 229a recorded with the light spot 225 as indicated by hatching is smaller than that of the reproducing light spot 226. Therefore, even if the scanning locus of the light spot 226 is shifted from that of the light spot 225 to a small extent, the information reproduction signal RF is not considerably influenced by such a shift, in contrast with the case of the single light source system shown in FIG. 3. The tracking margin becomes larger if the ratio of the sizes of the light spot 226 and 225 is increased in this manner. However, a reduction in the contrast of the information reproduction signal RF also results and, therefore, the increase in the size of the light spot 226 must be limited. If the wavelength of the light of the light spot 225 is selected so as to be different from that of the light spots 226, 227, and 228, reflected light of the light spot 225 can easily be separated by using a dichroic mirror to be prevented from mixing in the output from the light detecting device to affect the AF and AT controls.

An example of the construction of such a dual light source system will be described with reference to FIG. 8. In the arrangement shown in FIG. 8, an astigmatism system is used for AF control and a three-beam system is used for AT control. Referring to FIG. 8, a recording semiconductor laser device 201 emits a divergent beam of laser light having a wavelength of 830 nm. The divergent beam is changed into a parallel beam by a collimator lens 203. The parallel beam travels through a dichroic prism 207, a polarized beam splitter 208 and a ¼ wavelength plate 209 to be incident upon an objective lens 210. The beam is condensed as a small light spot on an optical card 211 by the objective lens 210 to record recording pits on a recording surface of the optical card 211 in accordance with information. The optical card 211 is the same as the optical card 107 shown in FIG. 1. Reflection light from the optical card 211 travels through the objective lens 210 and the ¼ wavelength plate 209 and is reflected by the polarized beam splitter 208 to travel toward a light detecting device 213 (same as the device 109 shown in FIG. 1). In this case, the reflected light is reflected and absorbed by a toric lens 212 having a film capable of cutting light having a wavelength of 830 nm which is prevented from reaching the light detecting device 213, thereby preventing 830 nm light from adversely influencing the information reproducing system and the AT/AF control system.

A divergent light beam from a reproducing semiconductor laser device 202 having a wavelength of 780 nm is changed into a parallel beam by a collimator lens 204, limited by an aperture 205, and split into plural beams by a diffraction grating 206. These plural beams are reflected by the dichroic prism 207 to irradiate the optical card 211 with a small spot by traveling along an optical path which is substantially the same as the optical path from the semiconductor laser device 201. Reflected light from the optical card 211 travels through the objective lens 210 and the ¼ wavelength plate 209, is reflected by the polarized beam splitter 208 and is condensed on the light detecting device 213 by the toric lens 212.

The light beam from the semiconductor laser device 202 forms, on the optical card 211, light spots larger than the light spot formed by the light from the semiconductor laser device 201, because of the aperture control with the aperture 205. The semiconductor laser device 202 is used for focusing control and tracking control and is therefore driven by a reproducing laser driver 223 so that the quantity of light emitted therefrom is constantly set to a small value irrespective of recording and reproduction. Information output from a controller 220 having a micro processing unit (MPU) is modulated in a modulation circuit 221 to form recording codes, and a recording laser driver 222 drives the recording semiconductor laser 201 in accordance with the recording codes to record the information on the optical card 211. Ordinarily, in actual apparatuses, recording information is supplied from an external unit. In such a case, the controller 220 includes an interface for connection with the external unit, and recording information is transmitted through the interface. Reproduced information is also transferred to the external unit through the interface.

The light detecting device 213 is the same as the light detecting device 109 shown in FIG. 1. More specifically, it includes the same elements as photosensors 114 to 116 shown in FIG. 4. A light receiving processing circuit 216 has the same components as the addition circuits 117, 118, and 121 and the differential circuits 119 and 120 shown in FIG. 4, and forms information reproduction signal RF, focusing error signal Af and tracking error signal $A_{ts}$ on the basis of signals of light received by the light detecting device 213. Focusing error signal Af is used to perform focusing control in such a manner that a focusing coil 214 is driven through an AF servo circuit 217 to displace the objective lens 210 in a focusing direction so that the light spots are focused on the optical card 211. Similarly, tracking error signal $A_{ts}$ is used to perform tracking control in such a manner that a tracking coil 215 is driven through an AT servo circuit 218 to displace the objective lens 210 in a tracking direction. The optical card 211 is reciprocatingly moved in the direction of the arrows shown in FIG. 8 relative to the light spots by a reciprocating movement mechanism (not shown), thereby scanning the information tracks of the optical card 211 with the light spots. Also in the thus-constructed dual light source system, when light spots deviate in a direction perpendicular to the track, received light signals $T_{s1}$ and $T_{s2}$ from the tracking control photosensors 115 and 116 of the light detecting device 213 change as shown in FIG. 5 and the tracking error signal $A_{ts}$ changes as shown in FIG. 6.

If a tracking control error occurs during information recording, the light spots may move to an adjacent or other track to destroy information already recorded in this track by doubly recording new information on the already-recorded information. To prevent information from being destroyed in this manner, a destruction prevention means for preventing information destruction by detecting a tracking control disturbance is adopted in each of the single and dual light source systems. In general, a tracking control error is detected through the level of the tracking error signal. That is, as explained above with reference to FIG. 8, the level of the tracking error signal is zero when the light spot 110 is positioned at the center of the information track. If the light spot 110 deviates in a direction perpendicular to the tracking direction from this state, the tracking error signal level changes in the plus or minus direction according to the direction of the deviation. A method is therefore adopted in which, when this level exceeds a predetermined positive or negative level, the occurrence of a tracking control error stops the information recording operation and prevents information from being destroyed by overwrite recording.

Such a prevention method, however, entails a problem described below. If the light spots 111 and 112 deviate from the tracking tracks tt3 and tt4 so that no portions thereof are located on the tracking tracks, then the tracking error signal becomes zero, as described above with reference to FIG. 6. This state cannot be discriminated from the normal state of tracking control. Thus, there is a possibility of failure to detect a tracking control error. This problem will be explained with reference to FIG. 9. FIG. 9 illustrates a situation where light spots 110 to 112 of the single light source system or light spots 225 to 228 of the dual light source system are scanning the information track T2 in the direction of the arrow to record information, and where a defect 224, such as a medium defect, an foreign particle attached to the card or a scratch, exists in an intermediate portion of the information track T2.

In the situation illustrated in FIG. 9, tracking control is normally made before a point O is reached. When the spots thereafter pass over the defect 224, the tracking error signal cannot be formed normally and tracking control is disturbed, so that the light spots move toward the adjacent information track T3. When the light spots pass the defect 224 and reach a point X such that no portions of the tracking control light spots 111 and 112 or 227 and 228 are located on the tracking tracks tt3 and tt4, the tracking error signal becomes zero, the tracking state is recognized as normal and this tracking control error cannot be detected. Thus, if such defect 224 exists on the information track, there is a possibility that the light spots moves to the adjacent information track T3 while the detection systems fails to perform tracking control, and new information is recorded over already-recorded information to destroy the same.

SUMMARY OF THE INVENTION

In view of the above-described problems, an object of the present invention is to provide an optical information recording and reproducing apparatus in which a high-frequency pit signal component which appears in a detection signal from a light detecting device for detecting reflected light from a recording medium is detected to detect a tracking control error and a recorded signal component, and which is therefore capable of reliably preventing already-recorded information from being destroyed by overwrite recording.

According to one aspect, the present invention which achieves these objectives relates to an optical information recording apparatus for at least recording information by irradiating an optical information recording medium having a plurality of information tracks with at least one light beam. The apparatus includes means for recording information on the recording medium with an information recording light beam. The apparatus also includes a plurality of detecting elements for detecting reflected light from the recording medium. In addition, high frequency component detection means detects a high frequency component of a signal corresponding to an output signal from at least one of the plurality of detecting elements. Control means stops the recording of information by the recording means when the high-frequency component detection means detects the high-frequency component during recording of information by the recording means.

In one embodiment, the recording means projects at least three light beams onto the recording medium. Two of the at least three light beams area used for tracking control for the third of the at least three light beams. The high-frequency component detection means detects the high-frequency component from an output signal from at least one of the plurality of detecting elements detecting reflected light from the two of the at least three light beams for tracking control. The third of the at least three light beams can be the information recording light beam and the apparatus can further comprise tracking control means for performing tracking control of the information recording light beam using the two of the at least three beams for tracking control.

In another embodiment, the apparatus further comprises a single light source producing a single light beam and a beam splitter for splitting this single light beam into a plurality of light beams, one of which is the information recording light beam used by the recording means for recording information on the recording medium. Alternatively, the apparatus can comprise a first light source for emitting the two of the at least three light beams for tracking control and a second light source for emitting the third of the at least three light beams, the third of the at least three light beams being the information recording light beam.

The apparatus can further comprise adjustment means for adjusting a change in the amplitude of the signal detected by the high-frequency component detection means according to the intensity modulation of the information light recording beam.

In another embodiment, the apparatus further comprises means for generating at least three light beams one of which is the information recording light beam which the recording means projects onto the recording medium for recording information thereon. The other two light beams are used for tracking control of the information recording light beam. This embodiment also includes means for generating a tracking error signal on the basis of an output signal from at least one of the detecting elements detecting reflected light from the light beams for tracking control. In this embodiment, the high-frequency component detection means detects the high-frequency component of the tracking error signal.

In an alternative embodiment, the apparatus comprises means for generating an additional signal of output signals from at least two of the detecting elements detecting reflected light of the light beams for tracking control. The high-frequency component detection means detects the high-frequency component of the addition signal.

The apparatus can further comprise means for reproducing information from the recording medium with the information reproducing light beams. When such means is included, the high-frequency component detection means can detect the high-frequency component from a signal corresponding to an output signal from at least one of the detecting elements detecting the reflected light of the information reproducing light beam. In addition, a single light source can be provided for emitting a single light beam. In this instance, means for splitting the single light beam into the information reproducing light beam and the information recording light beam can be provided. In this embodiment, means can also be provided for sampling a signal corresponding to an output signal from at least one of the detecting elements detecting the information reproducing light beam according to the intensity modulation of the information recording light beam. The high-frequency detection means detects a high-frequency component of the sampled signal in this embodiment.

DESCRIPTION OF THE PREFERRED EMBODIMENTS

Figure 7:
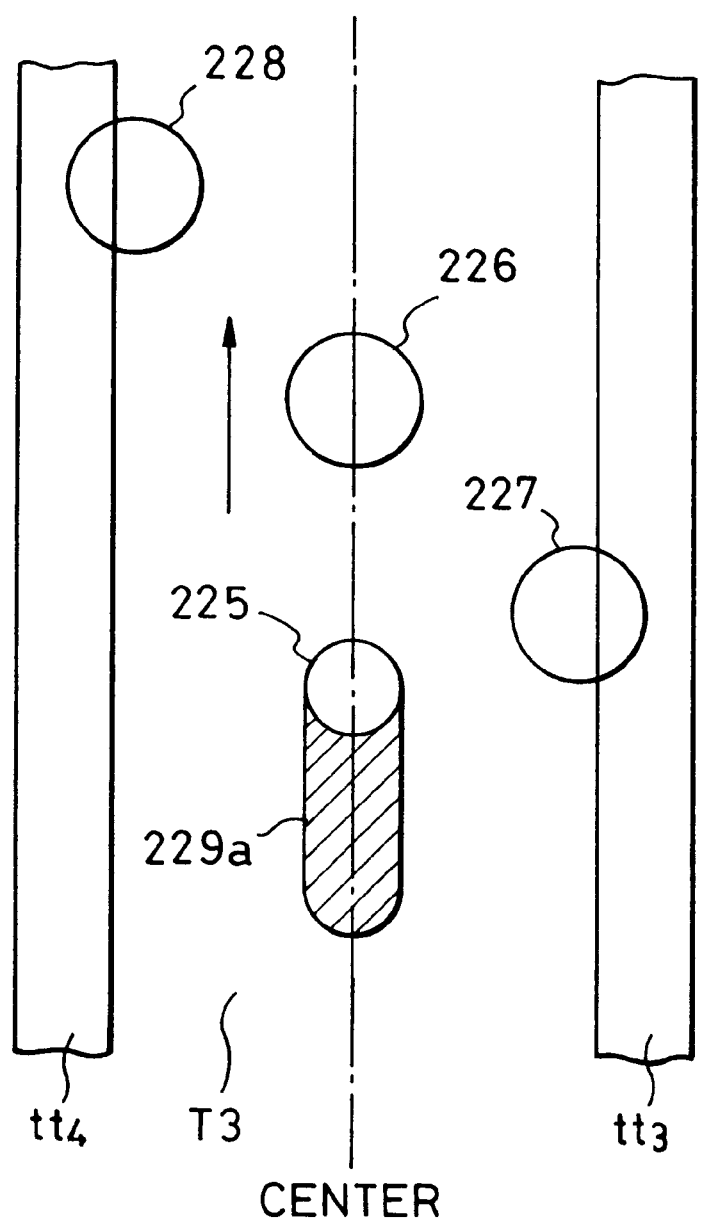
FIG. 7 is a schematic diagram of the disposition of light spots on an optical card surface in a dual light source system.
Figure 10:
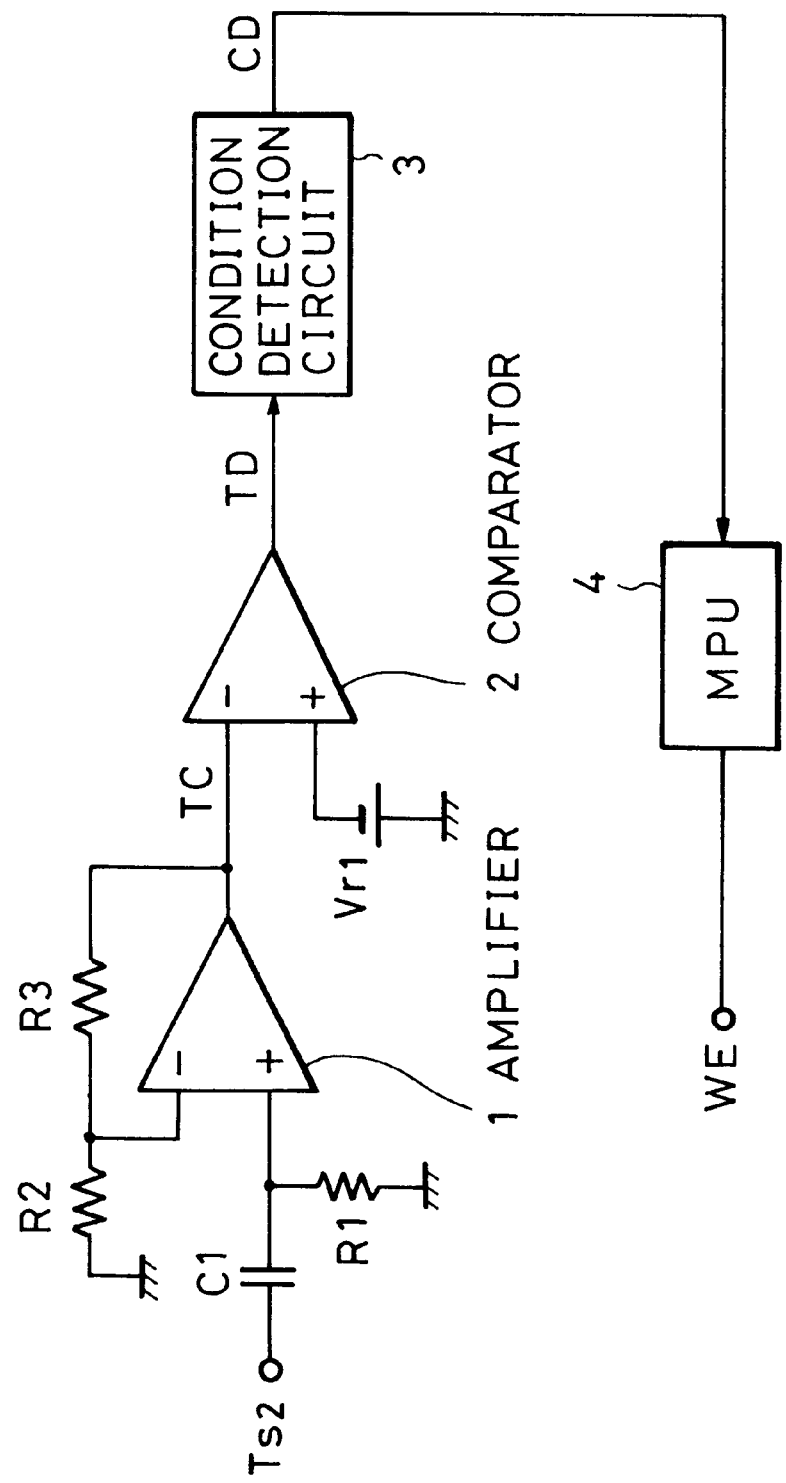
FIG. 10 is a circuit diagram of a first embodiment of an optical information recording and reproducing apparatus in accordance with the present invention.

The preferred embodiments of the present invention will be described below in detail with reference to the accompanying drawings. A first embodiment of the present invention will be described. FIG. 10 is a circuit diagram of the first embodiment applicable to the above-mentioned dual light source system. An amplifier 1 is provided to amplify received light signal $T_{s2}$ from the photosensor 116 shown in FIG. 4. It is assumed here that received light signal $T_{s2}$ from the photosensor 116 for detecting reflected light of light spot 228 in the dual light source system shown in FIG. 7 is input to the amplifier 1. Low-frequency components of the received light signal $T_{s2}$ are removed by a high-pass filter formed by a capacitor C1 and a resistor R1 before the received light signal $T_{s2}$ is input to the amplifier 1. Resistors R2 and R3 are provided to determine the amplification factor of the amplifier 1. An output signal TC from the amplifier 1 is two-valued to form a two-valued signal TD by being compared with a reference value $V_{r1}$ by a comparator 2. The two-valued signal TD is output from the comparator 2 to a condition detection circuit 3. The condition detection circuit 3 detects a disturbance in the tracking control by determining the condition of the tracking control from the output signal TD from the comparator 2. When the condition detection circuit 3 detects a tracking control disturbance, it outputs a signal CD to a micro processing unit (MPU) 4. The MPU 4 is a processing circuit for controlling the components of the apparatus and for performing control to stop the information recording operation if a tracking control disturbance is detected.

Figure 9:
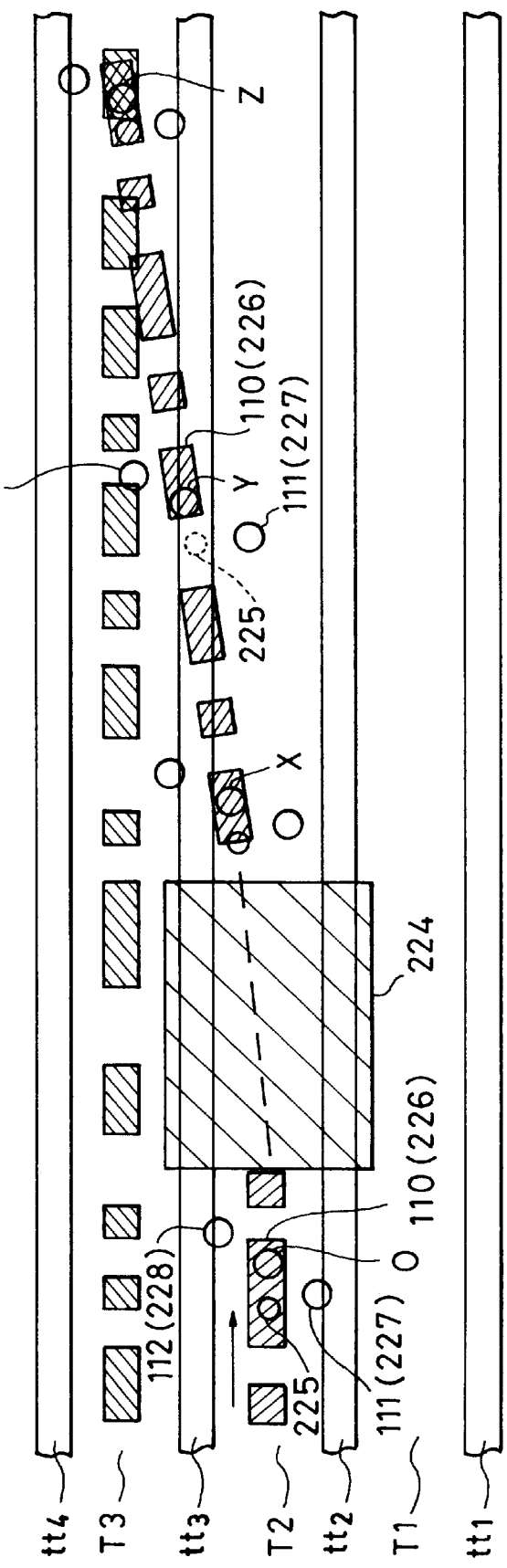
FIG. 9 is a schematic diagram of a state where tracking control is disturbed by a defect on an information track of the optical card so that light spots are shifted toward an adjacent track.
Figure 11:
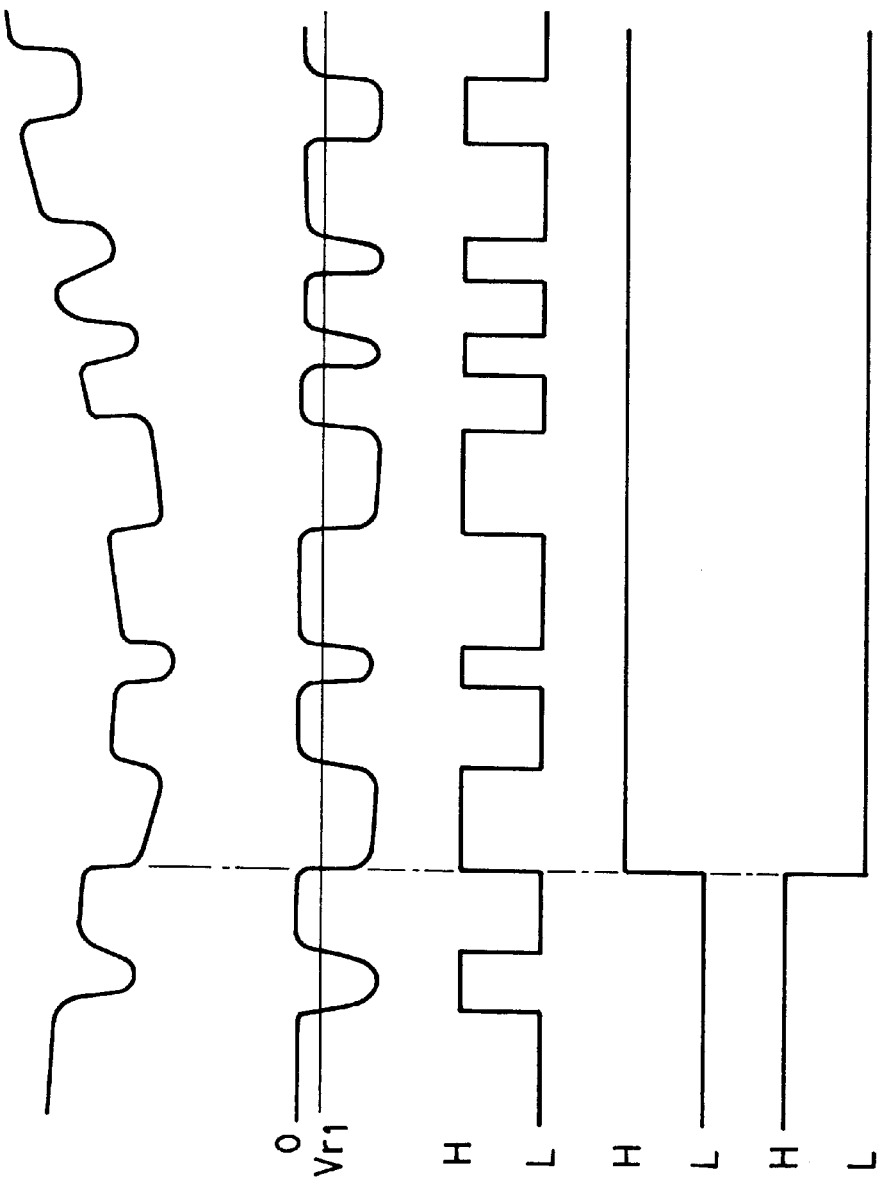
FIG. 11(a) is a time chart showing light signal $T_{s2}$ from photosensor 116.
FIG. 11(b) is a time chart showing an output signal TC from amplifier 1.
FIG. 11(c) is a time chart showing a signal TD output from comparator 2.
FIG. 11(d) is a time chart showing a high level signal CD output from a condition detection circuit.
FIG. 11(e) is a time chart showing an information recording permission signal WE from MPU 4.

The operation of the above-described embodiment will be described with reference to FIG. 11. The waveform shown in FIG. 11(a) represents the behavior over time of the received light signal $T_{s2}$ from the photosensor 116 which detects reflected light of tracking control light spot 228 in the dual light source system as described above. The received light signal $T_{s2}$ shown in FIG. 11(a) is obtained from the photosensor 116 when light spots 225 to 228 of the dual light source system move in the vicinity of a point Y shown in FIG. 9. In this example, there is a defect 224 on the information track T2 when information is recorded by scanning the information track T2 with the light spots 225 to 228, as shown in FIG. 9. In this situation, tracking control is disturbed when the light spots pass the defect 224, so that the light spots deviates from the information track T2 and move to the adjacent track T3, as described above. The received light signal $T_{s2}$ shown in FIG. 11(a) is detected by the photosensor 116 in the vicinity of the point Y, and components of the pit signal along the locus of movement of the light spot 228 appear as high-frequency components in the received light signal $T_{s2}$. These high-frequency components are not observed during normal recording, but appear in the received light signal $T_{s2}$ when tracking control is disturbed. The frequency of such high-frequency components is much higher than the frequency changes in the tracking error signal caused by vibration or the like or changes in the tracking error signal and the information reproduction signal due to a non-uniformity of the recording medium or foreign particles. Also, such pit signal components appear in a known regular arrangement, and the low-frequency component of the received light signal $T_{s2}$ shown in FIG. 11(a) is due to low-frequency fluctuations caused by vibration or a medium non-uniformity.

Figure 8:
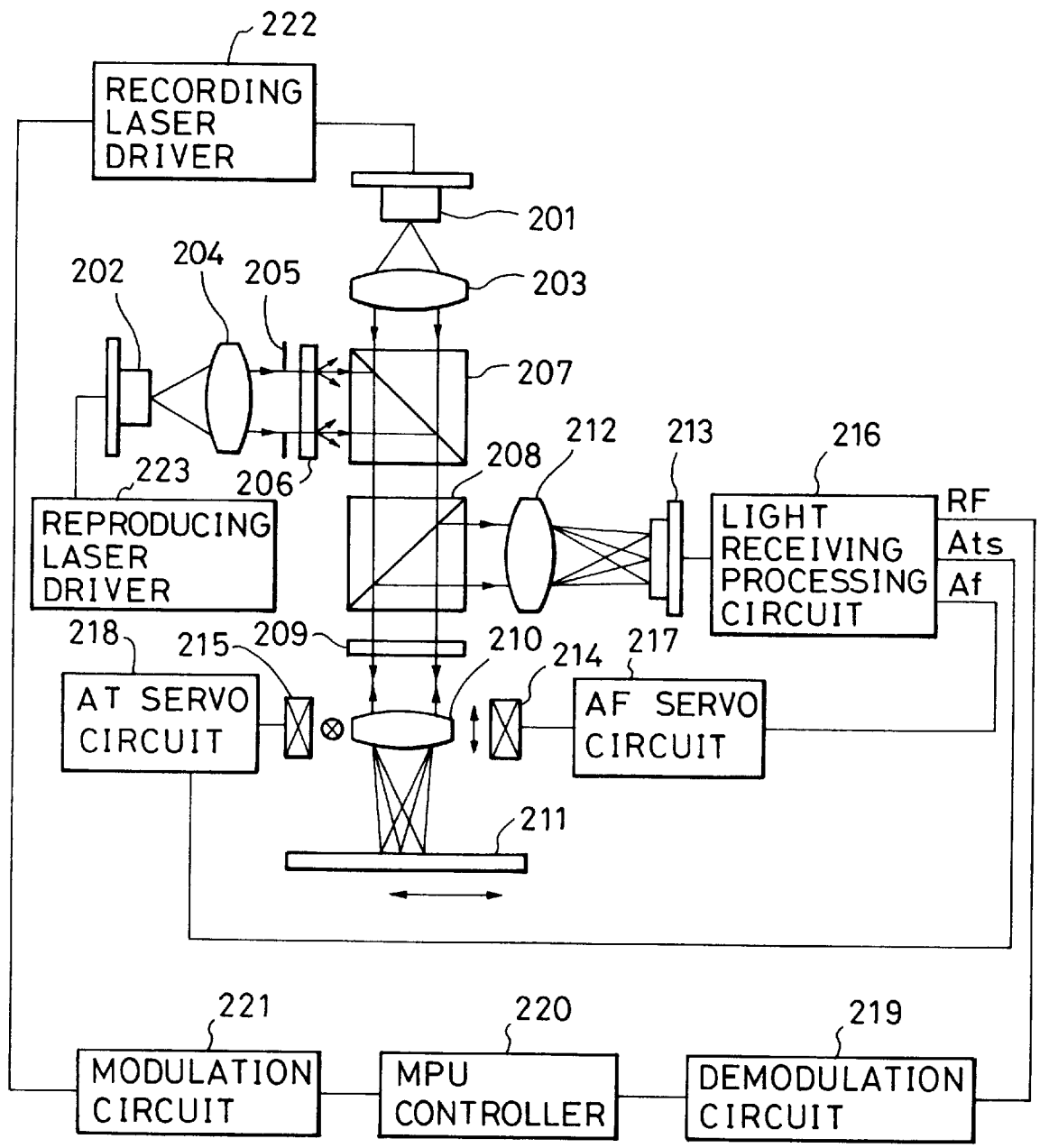
FIG. 8 is a schematic diagram of an optical information recording and reproducing apparatus using a dual light source system.

The received light signal $T_{s2}$ is input to the high-pass filter formed by the capacitor C1 and the resistor R1 to cut low-frequency components and to extract only high-frequency components. The high-frequency components extracted by the high-pass filter are amplified by the amplifier 1, as shown in FIG. 11(b). The output signal TC from the amplifier 1 is compared with the reference voltage $V_{r1}$ by the comparator 2, as shown in FIG. 11(c). The comparator 2 outputs a signal TD at a low level when the output signal TC of the amplifier 1 is higher than the reference voltage $V_{r1}$, and outputs the signal TD at a high level when the output signal TC is not higher than the reference voltage $V_{r1}$. The output signal TD from the comparator 2 is output to the condition detection circuit 3, and the condition detection circuit 3, the configuration and the operation of which will be described below in detail, detects a tracking control error on the basis of the output signal TD. The condition of light spot tracking control is discriminated on the basis of the output signal TD from the comparator 2. If circuit 3 determines that a tracking control error has occurred, the condition detection circuit 3 outputs a high-level signal CD representing a tracking control error as shown in FIG. 11(d). The MPU 4 monitors the output signal CD from the condition detection circuit 3 and performs control of the apparatus to stop the information recording operation by setting an information recording permission signal WE to low level if a tracking control error is determined to have occurred, as shown in FIG. 11(e). That is, the output signal WE from the MPU 4 is output to the recording laser driver 222 shown in FIG. 8, and the recording laser driver 222 is controlled so as to be allowed to record information when the signal WE is high level and inhibited from recording information when the signal WE is at a low level. However, when there is a tracking control error, the signal WE is set to a low level, as mentioned above, to stop the recording operation of the recording driver 222.

Figure 12:
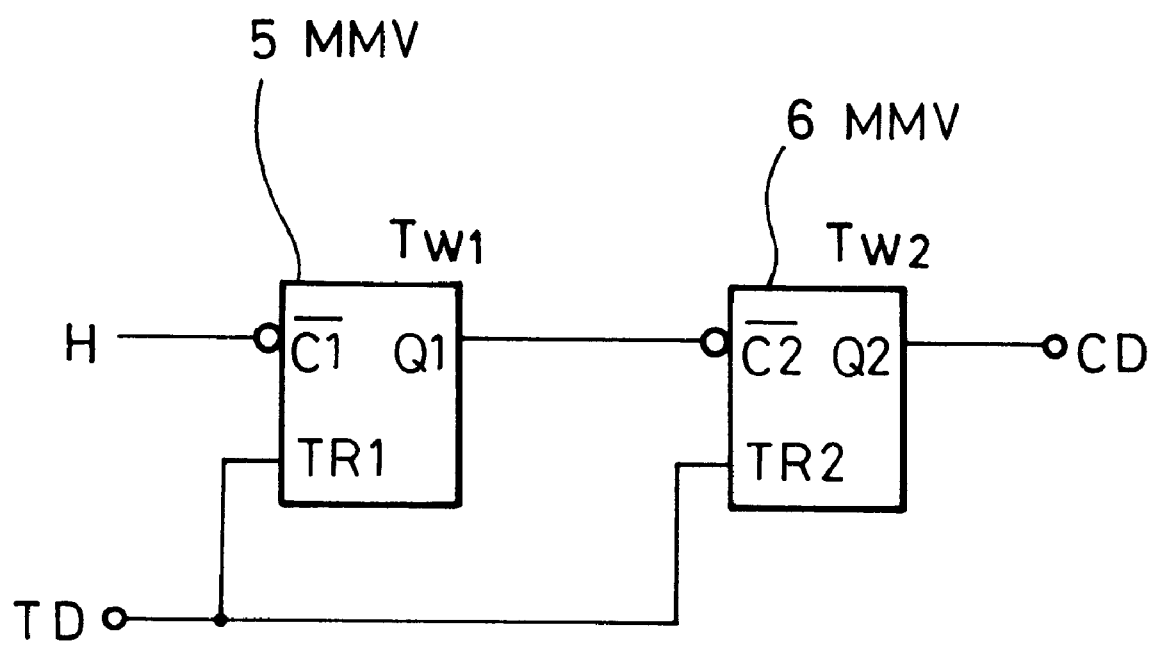
FIG. 12 is a circuit diagram of an example of a condition detection circuit 3 of the embodiment shown in FIG. 10.

FIG. 12 is a circuit diagram showing an example of the condition detection circuit 3. In this example, the circuit is arranged to prevent a defect from being erroneously detected as a pit signal component, since recording media such as optical cards generally have many defects. Each of blocks 5 and 6 in FIG. 12 represents a retriggerable monostable multivibrator ("MMV", hereinafter). Each of MMVs 5 and 6 is a device which, if a trigger is again input within a set time period, continues an output during the set time period from the moment at which the trigger is input. This device may be selected from various articles on the market, e.g., SN74123 (commercial name of a product from Texas Instruments Inc.) and TC74HC4538 (commercial name of a product from Toshiba Corp.)

A clear bar input terminal (inverting input terminal) C1 of MMV 5 is maintained at a high level, and the output signal TD from the comparator shown in FIG. 10, i.e., a signal obtained by causing the output signal from the amplifier 1 to take one of two values by comparing it with the reference voltage $V_{r1}$, is input to a trigger input terminal TR1. Accordingly, the output signal TD is input as a trigger to MMV 5, and an output Q1 from MMV 5 is set to high level by a rising edge of the trigger when the trigger is input. The output Q1 is thereafter maintained at high level for a set time period $T_{w1}$. The output Q1 from MMV 5 is input to a clear bar input terminal (inverting input terminal) of MMV 6 at the next stage. The output signal TD from the comparator 2 is also input to a trigger terminal TR2 of MMV 6. Accordingly, an output Q2 from MMV 6 is set to high level by a rising edge of the output signal TD only when the output Q1 of MMV 5 is high level. The output Q2 is thereafter maintained at high level for a set time period $T_{w2}$.

Figure 2A:
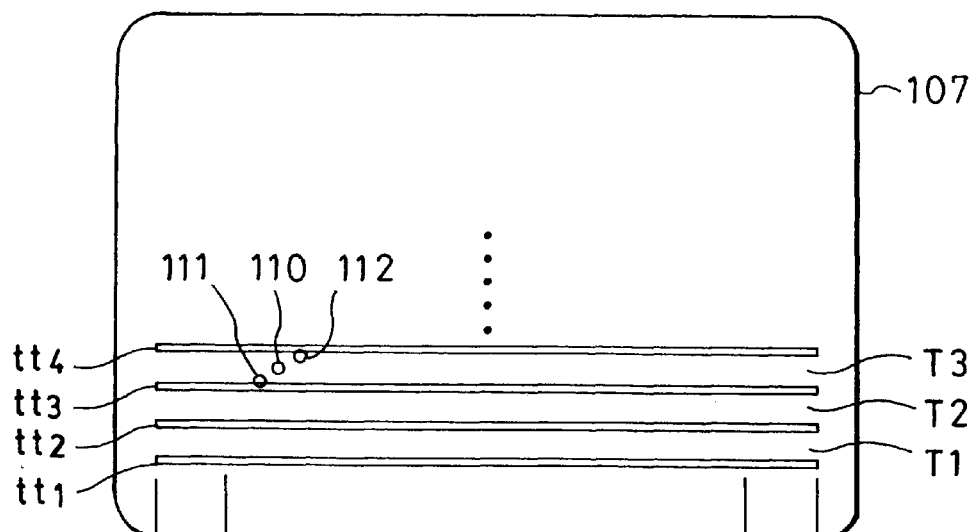
FIGS. 2(a) and 2(b) are schematic diagrams showing a recording surface of an optical card and the relationship between information tracks in the recording surface and the light spot scanning speed, respectively.
Figure 2B:
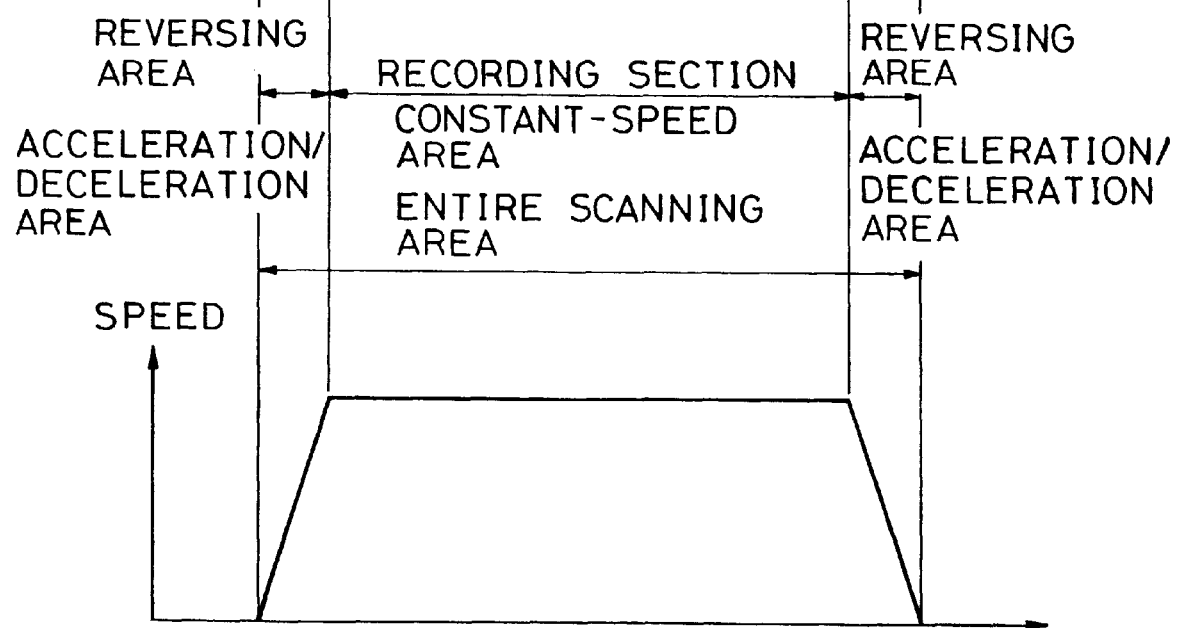
Figure 13:
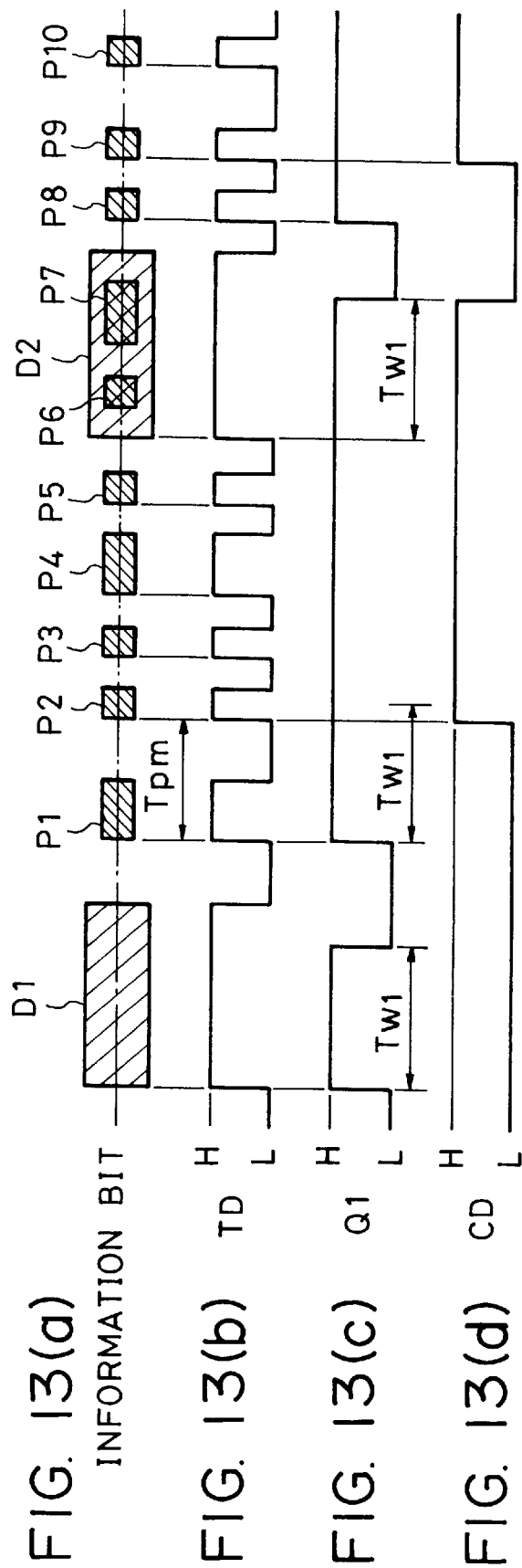
FIGS. 13(a)–13(d) are time charts of the operation of the condition detection circuit 3 shown in FIG. 12.

The operation of the above-described condition detection circuit 3 will be described with reference to FIGS. 13(a)–13(d). Hatched areas in FIG. 13(a) represent information pits optically recorded in an information track of the optical card shown in FIG. 2, and defects such as scratches or foreign particles existing on the information track, i.e., information pits P1 to P10 and defects D1 and D2. As an information recording method, a pit length recording method is adopted in which information is recorded as pit sizes and distances between pits. The same method is also used in the other embodiments of the invention. The waveform shown in FIG. 13(b) represents the output signal TD obtained by the comparator 2 when the light spot 228 scans the information pit array shown in FIG. 13(a). The output signal TD assumes a high level when the light spot 228 scans the information pits and assumes a low level when the light spot 228 scans between the information pits. The output signal TD also assumes a high level when light spot 228 scans a defect.

The output Q1 of MMV 5 assumes a high level when light spot 228 scans the leading end of the first defect D1, as shown in FIG. 13(c), since the signal TD rises to a high level at the leading end of the defect D1. The output Q1 is thereafter maintained at a high level for the time period $T_{w1}$. That is, the defect D1 is so long that the signal TD is not changed during the predetermined time period $T_{w1}$. Accordingly, the output Q1 of MMV 5 is maintained at a high level for the predetermined time period $T_{w1}$ and is inverted to a low level at the end of this time period. The output Q1 of MMV 5 and the signal TD are respectively input to the clear bar input terminal C2 and the trigger input terminal TR2 of MMV 6 to drive MMV 6. In this case, the output Q1 of MMV 5 rises to a high level with a time lag from the moment at which the signal TD changes from low level to high level. For this reason, the output Q1 of MMV 5 is at a low level and MMV 6 is not operated at the moment when the signal TD input to the trigger input terminal C2 of MMV 6 rises to high level when light spot 228 scans the leading end of the defect D1. The output Q2 (CD) of MMV 6 is therefore maintained at low level, as shown in FIG. 13(d).

Consequently, during passage of the light spot 228 over the defect D1, the output Q2 of MMV 6 is maintained at low level and the signal CD is not output.

Next, when the signal TD rises to high level when the light spot 228 scans the leading end of information pit P1, the output Q1 of MMV 5 is correspondingly inverted to high level, as shown in FIG. 13(c). The signal TD also assumes a high level when the light spot 228 scans the leading end of the next information pit P2 to again trigger MMV 5, so that the output Q1 of MMV 5 is further maintained at a high level. That is, because the time period $T_{pm}$ during which the light spot 228 scans from the leading end of information pit P1 to the leading end of information pit P2 is shorter than the set time period $T_{w1}$ of MMV 5, MMV 5 is triggered when the light spot 228 scans the leading end of information pit P2 to be maintained at high level. Since the time period $T_{w1}$ is set so as to be longer than the time period $T_{pm}$ taken to scan the maximum pit pitch of the information pit array, the output Q1 of MMV 5 is maintained at high level as long as information pits are spaced so they can be scanned within time period $T_{pm}$.

The output Q1 of MMV 5 rises to a high level when the light spot 228 scans the leading end of information pit P1 and this high level signal is thereafter supplied to the clear bar input terminal C2 of MMV 6. Therefore, the output Q2 of MMV 6 is inverted to a high level when the signal TD assumes a high level when the light spot 228 scans the leading end of information pit P2, as shown in FIG. 13(d). The signal CD is thereby output and the MPU 4 performs control of the apparatus in response to the signal CD to stop the information recording operation. To continuously output the signal CD, it is necessary that the set time period $T_{w2}$ of MMV 5 is longer than $T_{pm}$, as in the case of $T_{w1}$. In this case, $T_{w2}$ is set so as to be longer than $T_{w1}$. There is also defect D2 in the information pit array, as shown in FIG. 13(a), and the output Q1 of MMV 5 is inverted to a low level at the end of the time period $T_{w1}$ starting from the moment the light spot 228 scans the leading end of the defect D2, as shown in FIG. 13(c). Accordingly, the output Q2 from MMV 6 is simultaneously inverted to a low level, so that the signal CD is interrupted at an intermediate position on the information pit array. A modification in signal processing provided to solve this problem will next be described.

In the example shown in FIGS. 13(a)–13(d), even if a defect exists on the information track and even if the size of the defect is excessively large, there is no possibility of outputting the signal CD by erroneously recognizing the defect as an information pit because the signal TD does not change continuously within the set time period $T_{w1}$. It is therefore possible to reliably prevent erroneous detection of a defect as a pit signal. Therefore, even if the optical card has many defects, the recording operation of the apparatus is not frequently stopped and the recording operation is stopped only when the tracking control is disturbed. With respect to detection of information pits, one information pit cannot be detected separately but two or more information pits can reliably be detected as long as they are scanned successively. Thus, it is possible to reliably prevent erroneous detection of a defect as well as to detect pit signal components with high detection sensitivity of two information pits.

Another example of the condition detection circuit 3 will next be described. In the example shown in FIG. 12, there is a possibility of the signal CD being interrupted if there is a defect at an intermediate position on an information pit array, as described above. That is, even through information pits P6 and P7 are recorded, they are masked with the defect D2 located on them, as shown in FIG. 13(a). In such a situation, the signal TD is not changed, as shown in FIG. 13(b), the output Q1 of MMV 5 is inverted to a low level at the intermediate position, and the signal CD is also inverted to a low level. When information pit P8 and subsequent information pits are successively scanned after the defect D2, the signal CD is output again and is interrupted at an intermediate position on the information pit array. Such a phenomenon is not a problem if the operation is intended to detect only the initial pit. In general, however, error correction codes are added to recorded information to enable an error destroying a part of recorded information to be corrected. If the recording operation is stopped when the signal CD is output for a set error-correctable time period, the probability of stoppage of the recording operation caused by erroneous detection due to a medium defect can be reduced. However, if the signal CD is interrupted, such a control cannot be performed.

Figure 14:
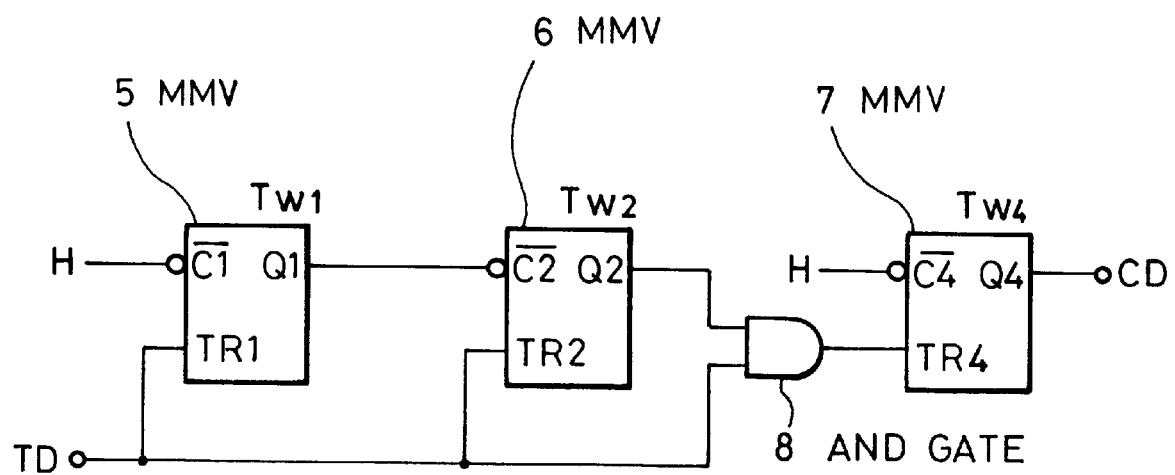
FIG. 14 is a circuit diagram of another example of the condition detection circuit 3.

The example of the condition detection circuit shown in FIG. 14 is arranged to solve the problem of such an interruption of the signal CD. Blocks 5 and 6 also represent the same MMVs as those shown in FIG. 12. The output Q2 of MMV 6 and the signal TD are input into an AND gate 8, and an output from the AND gate 8 is input to a trigger input terminal TR4 of an MMV 7, which is a retriggerable monostable multivibrator similar to MMVs 5 and 6. A clear bar input terminal (inverting input terminal of MMV 7 is always maintained at high level and an output Q4 from MMV 7 is output as signal CD.

Figure 15:
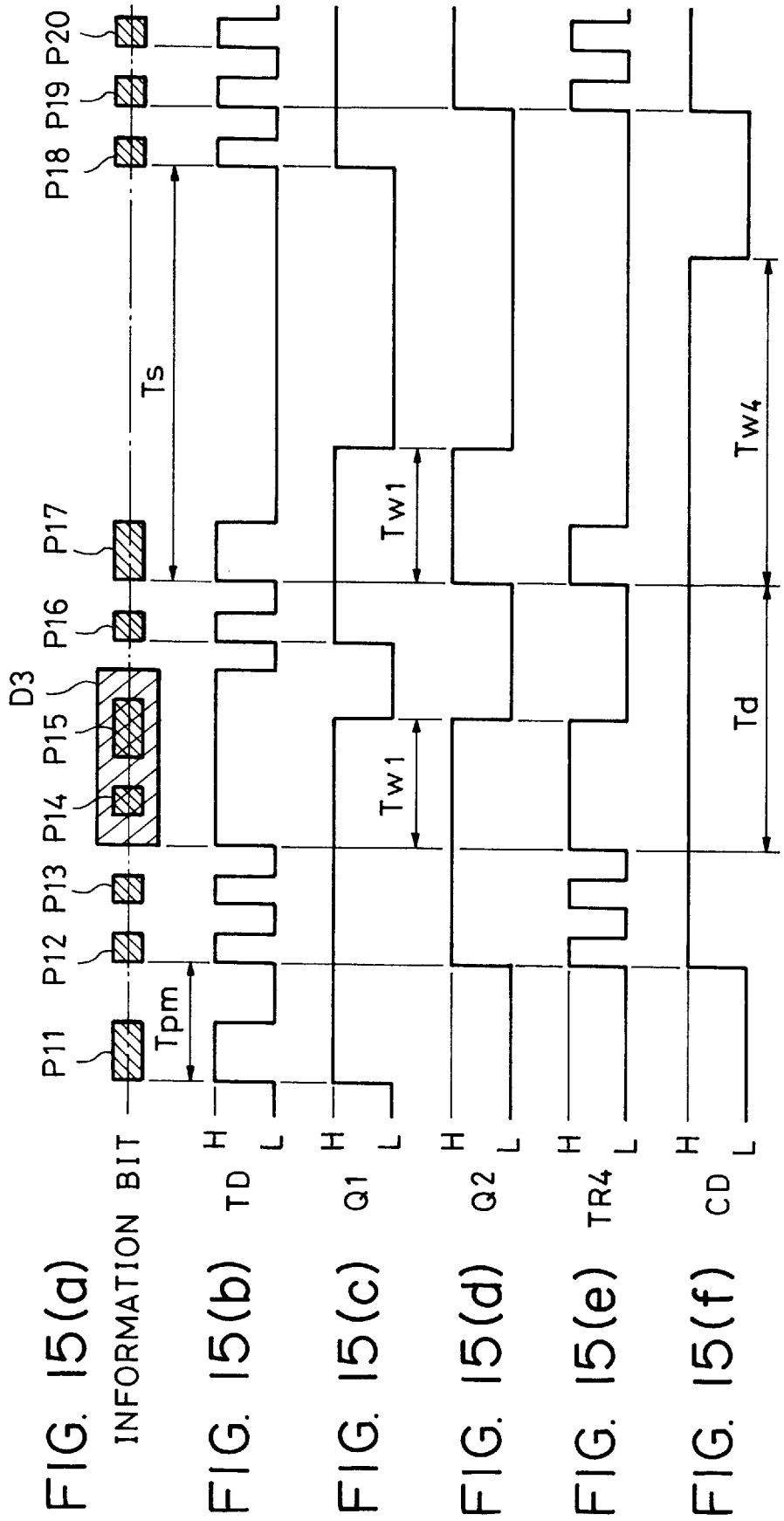
FIGS. 15(a)–15(f) are time charts of the operation of the condition detection circuit 3 shown in FIG. 14.

The operation of the condition detection circuit 3 shown in FIG. 14 will be described with reference to FIGS. 15(a)–15(f). Information pits are recorded in an information track, as shown in FIG. 15(a). Information pits P11 to P17 form one information pit array and information pits P18 to 20 form another information pit array. That is, information pits P11 to P17 form a pit array of one track number or recorded sector, while information pits P18 to P20 form a pit array of another track number or recorded sector. A defect D3 exists over information pits P14 and P15 so as to mask these pits. The waveform shown in FIG. 15(b) represents the output signal TD obtained by the comparator 2 when the information track shown in FIG. 15(a) is scanned with the light spot 228. The output Q1 from MMV 5 rises to a high level when the light spot 228 scans the leading end of information pit P11, as shown in FIG. 15(c). Since as in the case of the example shown in FIG. 12, the set time period $T_{w1}$ of MMV 5 is set so as to be longer than the time period $T_{pm}$ taken to scan the maximum pit pitch with the light spot 228, the high level of output Q1 is maintained as long as information pits appear successively. However, since the defect D3 exists at an intermediate position on the information pit array, the output Q1 from MMV 5 is inverted to low level after a time period $T_{w1}$ starting from the moment when the light spot 228 scans the leading end of the defect D3.

On the other hand, the output Q2 from MMV 6 rises to a high level when light spot 228 scans the leading end of information pit P12, as shown in FIG. 15(d), and becomes inverted to assume a low level after a time period $T_{w1}$ starting from the moment when the light spot 228 scans the leading end of the defect D3, as in the case of the output Q1 of MMV 5. The signal TD is gated by the AND gate 8 with the output Q2 of MMV 6 to input a trigger signal such as that shown in FIG. 15(e) to the trigger input terminal TR4 of MMV 7. As a result, the output Q4 from MMV 7 rises to a high level when the light spot 228 scans the leading end of information pit P12 to be output as signal CD, as shown in FIG. 15(f). Actually, it is possible that the signal CD is delayed slightly according to a time lag of the circuit. Such a delay, however, is negligible in comparison with the pit scanning time.

If the time period taken to scan from the leading end of the defect D3 to the leading end of the rearmost information pin P17 of the pit array is $T_d$, the set time period $T_{w4}$ of MMV 7 is set so as to be longer than the time period $T_d$ ($T_{w4} > T_d$). Therefore, even when the outputs Q1 and Q2 of MMVs 5 and 6 assume a low level after a time period $T_{w1}$ starting from the moment when the light spot 228 scans the leading end of the defect D3, the output Q4 of MMV 7 is maintained at a high level to continuously output the signal CD, as shown in FIG. 15(f). The outputs Q1 and Q2 of MMVs 5 and 6 are respectively inverted to assume a low level after a time period $T_{w1}$ starting from the moment the light spot 228 scans the leading end of the rearmost information pit P17 of the pit array, as shown in FIGS. 15(c) and 15(d). Since MMV 7 is triggered when the light spot 228 scans the leading end of information pit P17, the output Q4 from MMV 7 is inverted to a low level after a time period $T_{w4}$ from when MMV 7 has been triggered, as shown in FIG. 15(f). Consequently, the signal CD is output from the moment when the light spot 228 scans the leading end of the second information pit P12 of the pit array to time $T_{w4}$ after the moment when the light spot 228 scans the leading end of the rearmost information pit P17 of the pit array. Pit signals are detected with respect to one pit array in the above-described manner, and pit signal detection is also performed in the same manner with respect to the pit array starting from the next information pit P18. The time intervals between the pit arrays is Ts, as shown in FIG. 15(a). To set the signal CD to a low level between the pit arrays, it is necessary that $T_{W4} < T_S$. It is also necessary to select as $T_S$ the shortest interval with respect to various sector patterns to be recorded.

As described above, in the example shown in FIG. 14, the signal CD can be continuously output without being interrupted even if a defect exists in the information pit array. In this example, however, it is possible to prevent interruption of the signal CD with respect to defects having lengths not larger than the minimum sector interval. Accordingly, the MPU 4 stops the recording operation when the signal CD is output during a predetermined error-correctable time period, thereby reducing the probability of recording operation stoppage caused by erroneous detection due to a defect.

Figure 16:
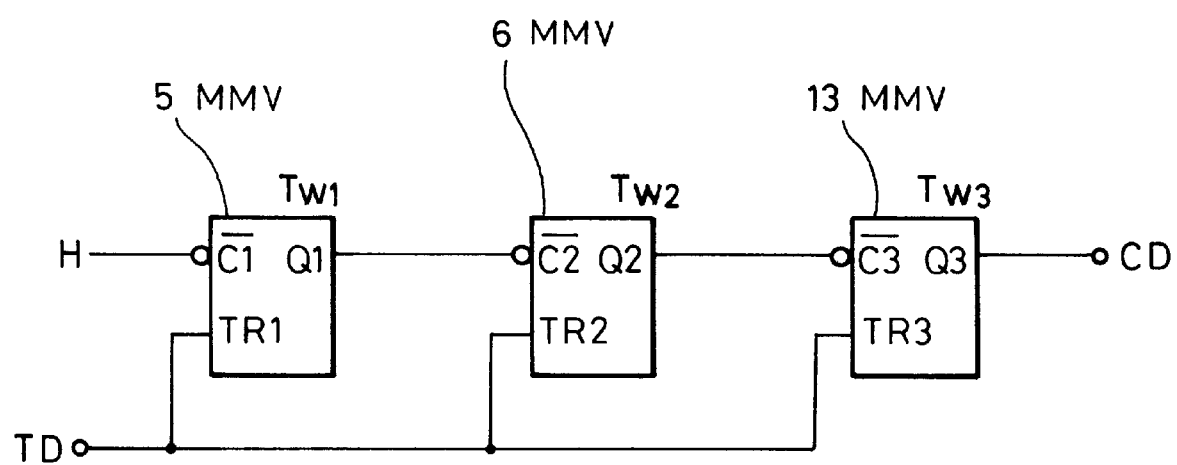
FIG. 16 is a circuit diagram of still another example of the condition detection circuit 3.

Still another example of the condition detection circuit will next be described. Small defects exist on the recording medium as well as large ones, and the probability of the existence of small defects within the maximum pit pitch is not negligibly small. Therefore, there is a possibility of the occurrence of erroneous CD detection due to such a small defect in the case of the examples shown in FIGS. 12 and 14. FIG. 16 shows an improved condition detection circuit to solve the problem due to such a small defect. Blocks 5 and 6 in FIG. 16 represent the same MMVs as those shown in FIG. 12, and a block 13 represents an MMV connected as a stage subsequent to MMV 6. MMV 13 is a retriggerable monostable multivibrator similar to MMVs 5 and 6. The output Q2 from MMV 6 and the signal TD are respectively input to a clear bar input terminal (inverting input terminal) C3 and a trigger input terminal TR3 of MMV 13, and an output Q3 from MMV 13 is output as signal CD.

The operation of the condition detection circuit shown in FIG. 16 will be described with reference to FIGS. 17(a)–17

(e), which illustrate defects on an information track and an information pit array in the track. Hatched areas D4 to D6 represent defects while hatched areas P1 to P6 represent information pits. A time period $T_{dp1}$ during which the pitch between defects D4 and D5 is scanned is shorter than the set time period of $T_{w1}$ of MMV 5 ($T_{dp1}<T_{w1}$) Thus, a small defect exists within the maximum pit pitch. The set time period $T_{w1}$ of MMV 5 is set so as to be longer than the time period taken to scan the maximum pit pitch, as in the case of the examples shown in FIGS. 12 and 14. The time interval needed to scan defects D5 and D6 is longer than $T_{w1}$, and information pits P1 to P6 are recorded after defect D6.

When the light spot 228 scans the information track shown in FIG. 17(a), the signal TD is output from the comparator 2, as shown in FIG. 17(b). As shown in FIG. 17(c), the output Q1 from MMV 5 rises to a high level when the light spot 228 scans the leading end of defect D4, MMV 5 is triggered when the light spot 228 scans the leading end of defect 5, and the output Q1 is inverted to a low level at a time $T_{w1}$ after the moment at which MMV 5 is triggered. As shown in FIG. 17(d), the output Q2 of MMV 6 rises to a high level when the light spot 228 scans the leading end of defect D5 and becomes inverted to assume a low level simultaneously with the output Q1 of MMV 5 assuming a low level. The output Q3 of MMV 13 is maintained at a low level and the signal CD is not output, as shown in FIG. 17(e). In the examples shown in FIGS. 12 and 14, a sequence of small defects D4 and D5 such as that shown in FIG. 17(a) causes erroneous detection, since the output Q2 of MMV 6 is output as signal CD. In this example, the signal CD is not output in such a situation and there is no possibility of erroneous detection of small defects, because MMV 13 is connected subsequently to MMV 6. A single defect D6 after defect D5 cannot not cause the CD signal to be output.

When information pits P1 to P6 are scanned, the output Q3 from MMV 13 rises to a high level when the light spot 228 scans the leading end of information pit P3, and the signal CD is output when the light spot 228 scans the third information pit from the head pit P1 of the information pit array, as shown in FIG. 17(e). That is, since the circuit is arranged so that the signal CD is not output even if two small defects are successively scanned, information pits cannot be detected unless the number of successive information pits is three or more. In other words, the information pit detection sensitivity in terms of the number of information pits is reduced to three pits, because the probability of erroneous detection of small defects is reduced. Accordingly, if a recording medium in which many small defects appear successively with a pitch smaller than $T_{w1}$, a certain number of retriggerable monostable multivibrators according to the number of successive defects may be connected subsequently to MMV 13 to correspondingly reduce the probability of erroneous detection due to the defects. However, the information detection sensitivity is also reduced correspondingly.

Figure 17:
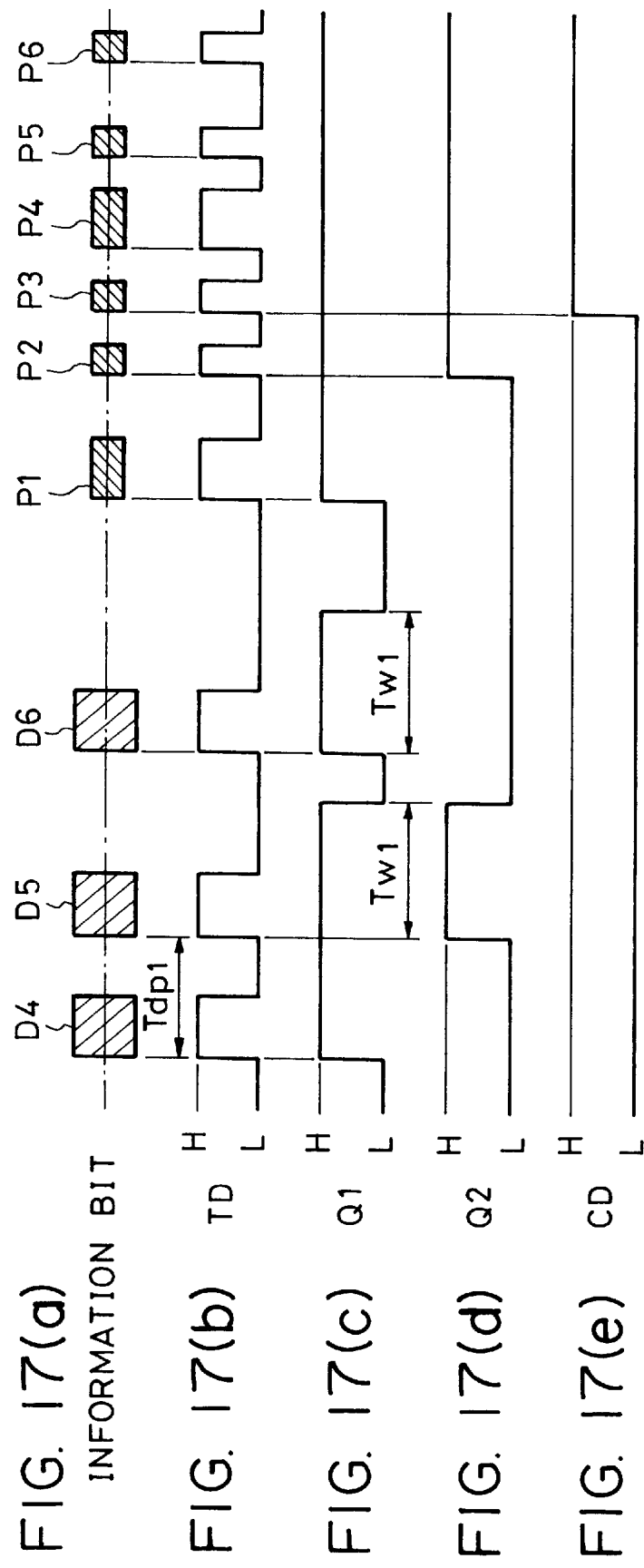
FIGS. 17(a)–17(e) are time charts of the operation of the condition detection circuit 3 shown in FIG. 16.

Thus, in the example shown in FIG. 17, the possibility that small defects existing successively with a pitch smaller than the maximum pit pitch are erroneously detected as information pits is reduced and the reliability of pit signal detection is improved. It has been stated with respect to this example that it is possible to prevent erroneous detection due to defects by connecting a suitable number of MMVs. However, a recording medium having many small defects existing successively with a pitch smaller than $T_{w1}$ is regarded as useless considering the ordinary function of recording media. Therefore, the arrangement in which three MMVs are connected as shown in FIG. 16 will suffice for ordinary use. If MMV 7 is connected subsequently to MMV 13 through AND gate 8 as shown in FIG. 14, it is possible to prevent interruption of the CD signal due to a defect in the pit array.

Figure 1:
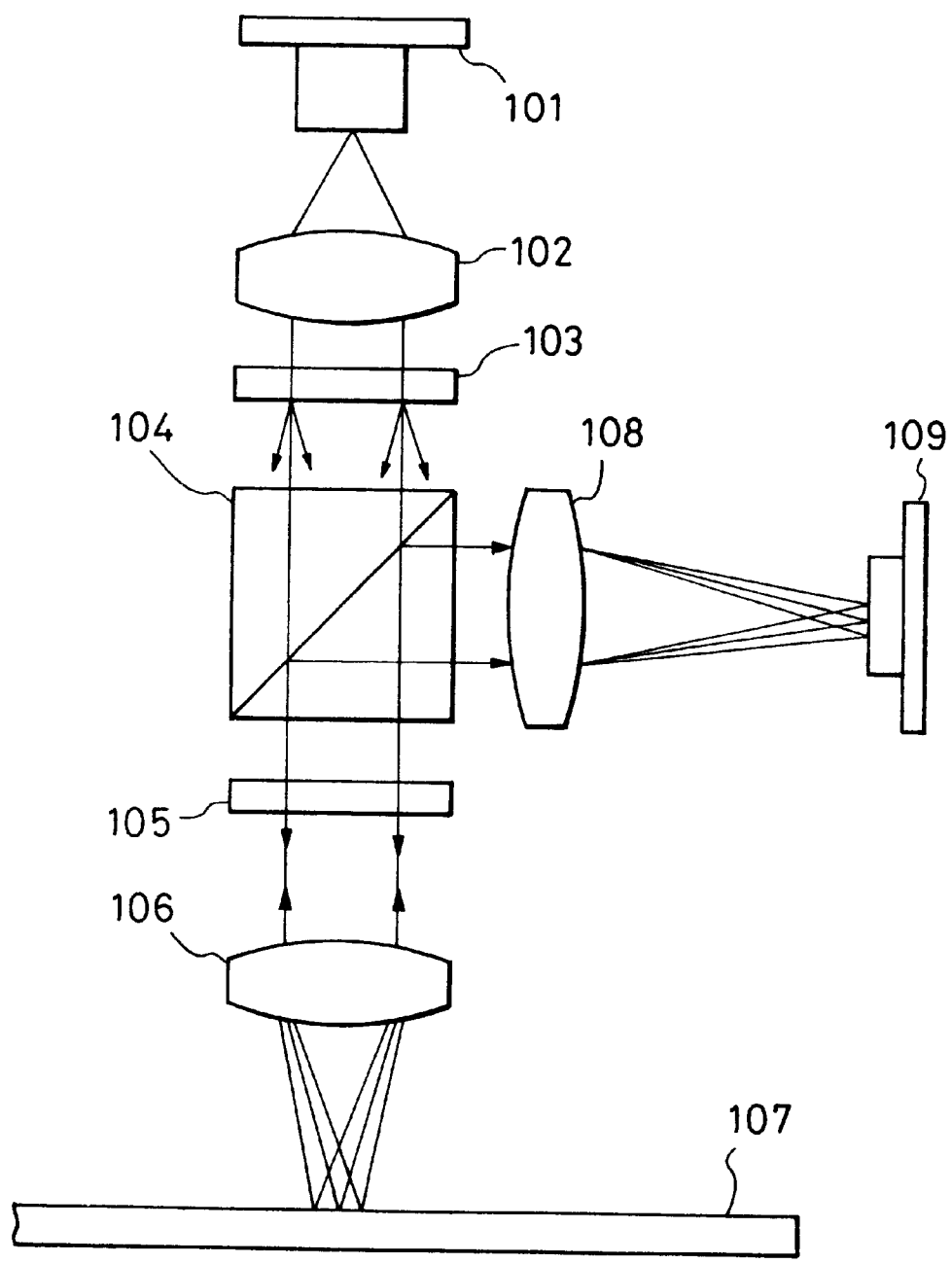
FIG. 1 is a schematic diagram of an optical system of a conventional optical information recording and reproducing apparatus using a single light source system.
Figure 3:
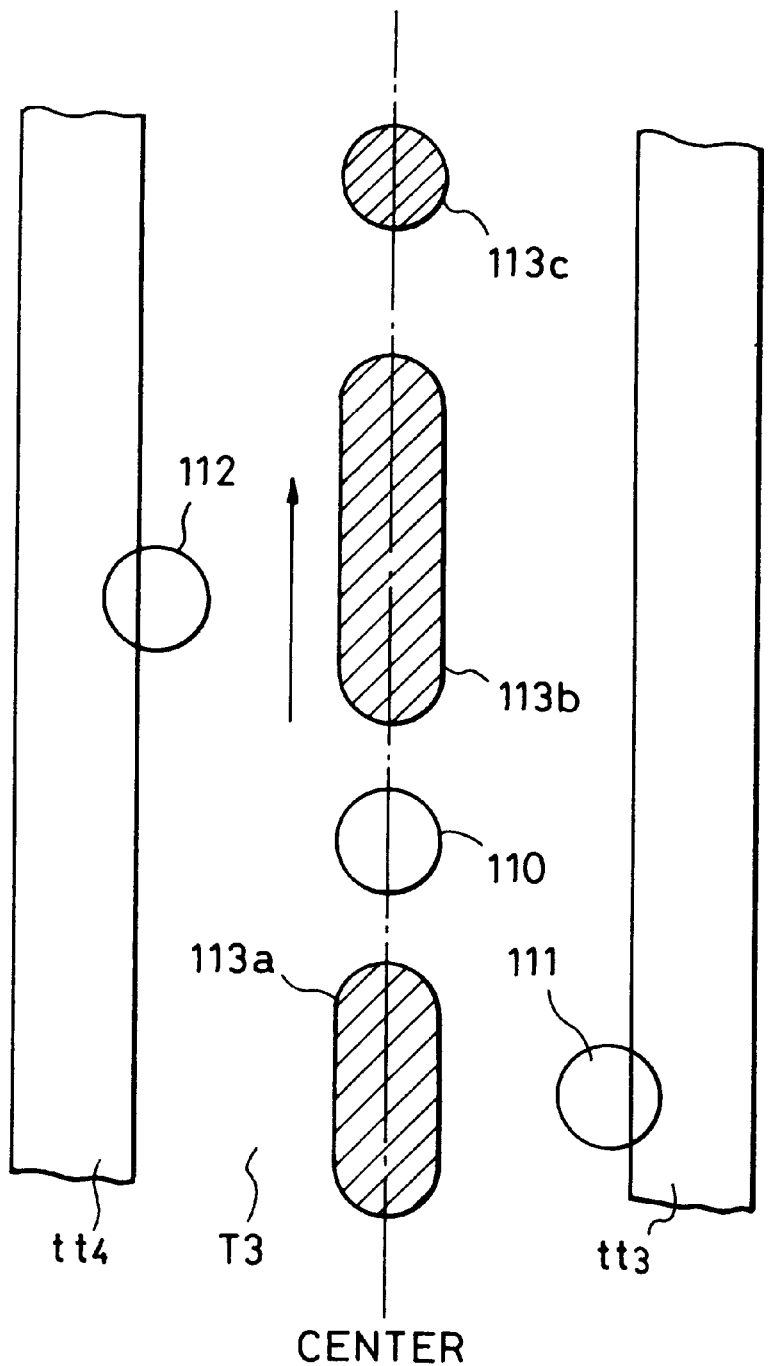
FIG. 3 is a schematic diagram of the disposition of light spots on the optical card surface in the single light source system.
Figure 18:
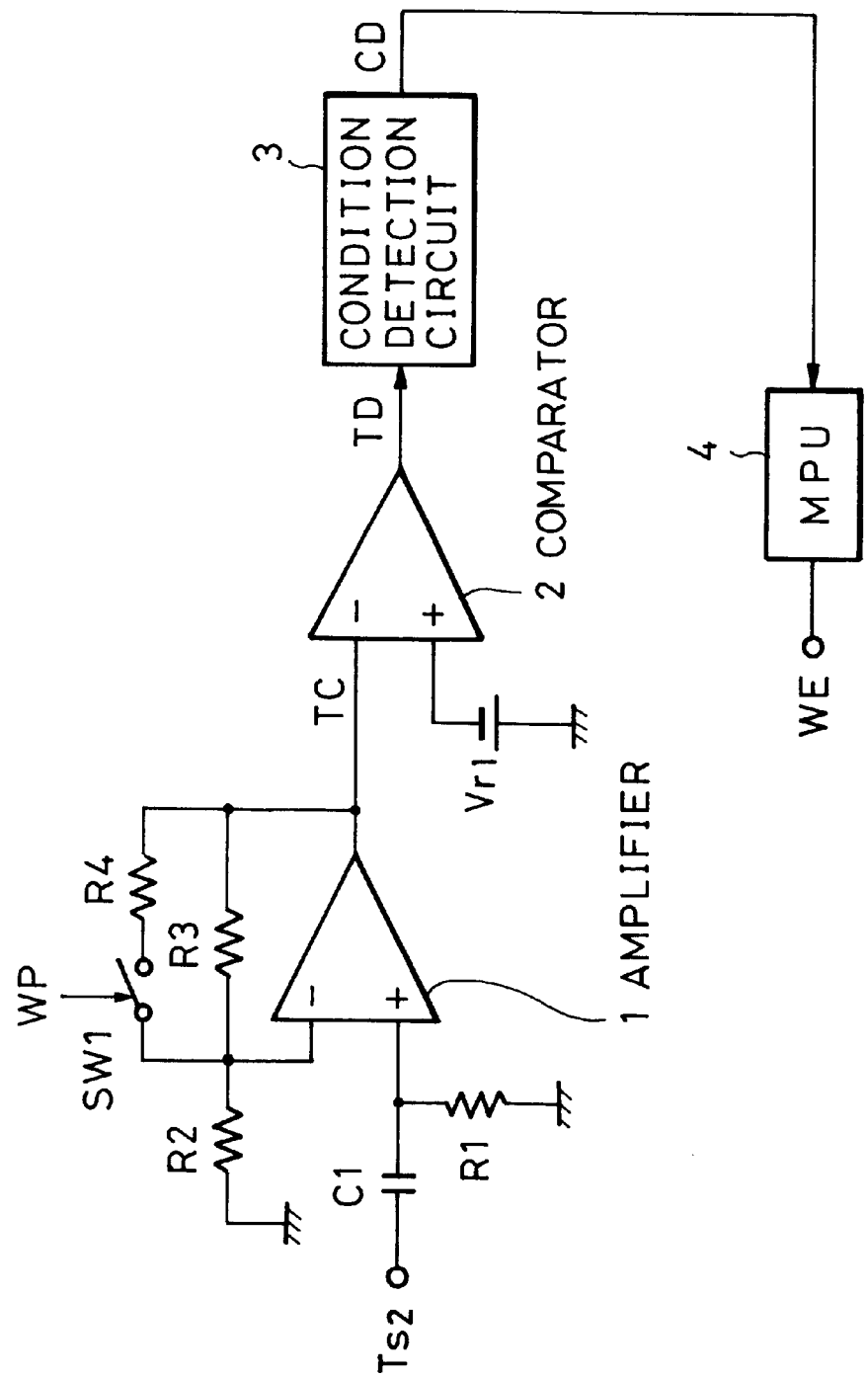
FIG. 18 is a circuit diagram of a second embodiment of the present invention.

FIG. 18 is a circuit diagram of the second embodiment of the present invention. The same reference numerals and letters as those used in FIG. 10 designate the same elements. This embodiment is applicable to an apparatus using the single light source system shown in FIG. 1. In the single light source system, when information is recorded, the recording light spot 110 shown in FIG. 3 is intensity-modulated in accordance with a recording pulse, and the tracking control spots 111 and 112 are also modulated simultaneously. Therefore, if the circuit shown in FIG. 10 is used, a signal synchronized with recording pulses appears in the output signal TD from the comparator 2 and the CD signal is output from the condition detection circuit 3 even under normal recording conditions. This embodiment is arranged to be applied to the single light source system by removing the undesirable influence of such recording pulse modulation.

Referring to FIG. 18, a series combination of a resistor R4 and a switching device SW1 is connected in parallel with a resistor R3 forming a feedback circuit of an amplifier 1. The switching device SW1 is turned on by a recording pulse WP. When the switching device SW1 is turned on and the switch SW1 is closed, the feedback resistance of the amplifier 1 is set to the resistance value of a parallel combination of the resistors of R3 and R4, thereby reducing the gain of the amplifier 1. In this embodiment, the ratio of the resistance value of the resistor 3 and the resistance value of the parallel combination of the resistors R3 and R4 is set to be equal to the ratio of light intensity modulation with recording pulses, thereby ensuring that even if the tracking control light spots are intensity-modulated, the output from the amplifier 1 is not influenced by this modulation. Except for these points, the configuration of this embodiment is the same as that of the embodiment shown in FIG. 10, and control of the apparatus is performed so that the information recording operation is stopped if tracking control is disturbed so that a pit signal high-frequency component is detected from the received light signal $T_{s2}$. Thus, in this embodiment, the influence of intensity modulation of the light spots on recording pulses can be eliminated to detect a tracking control disturbance in the single light source system as effectively as the embodiment of FIG. 10, thereby preventing the occurrence of overwriting of recorded information.

Figure 4:
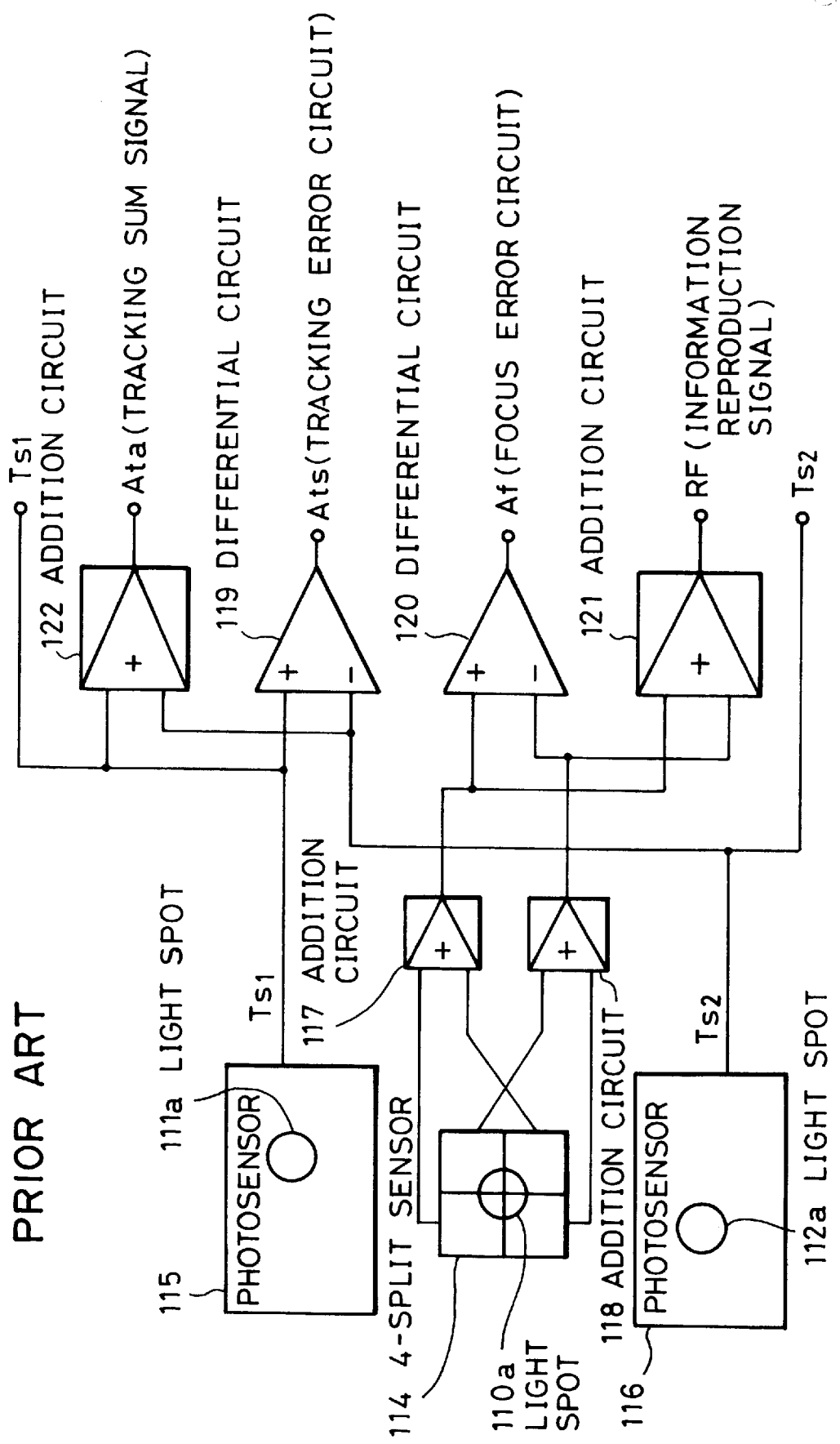
FIG. 4 is a circuit diagram of photosensors and a signal processing circuit of the apparatus shown in FIG. 1, in which a tracking error signal, a focusing error signal and an information reproduction signal are formed from detection signals from the photosensors.
Figure 5:
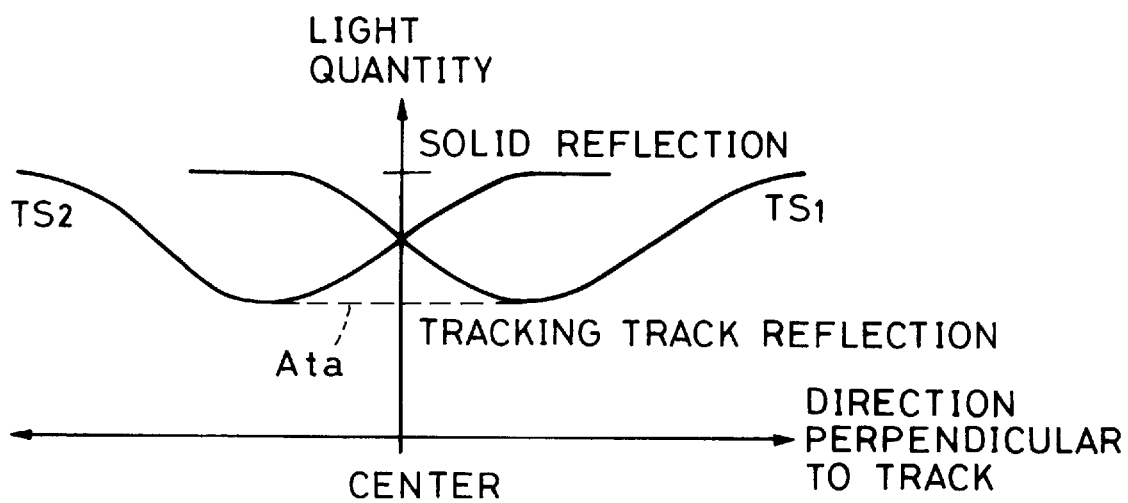
FIG. 5 is a graph showing the relationship between the amount of deviation of tracking control light spots and the quantity of light of received light signals from the photosensors in the apparatus shown in FIG. 1.
Figure 6:
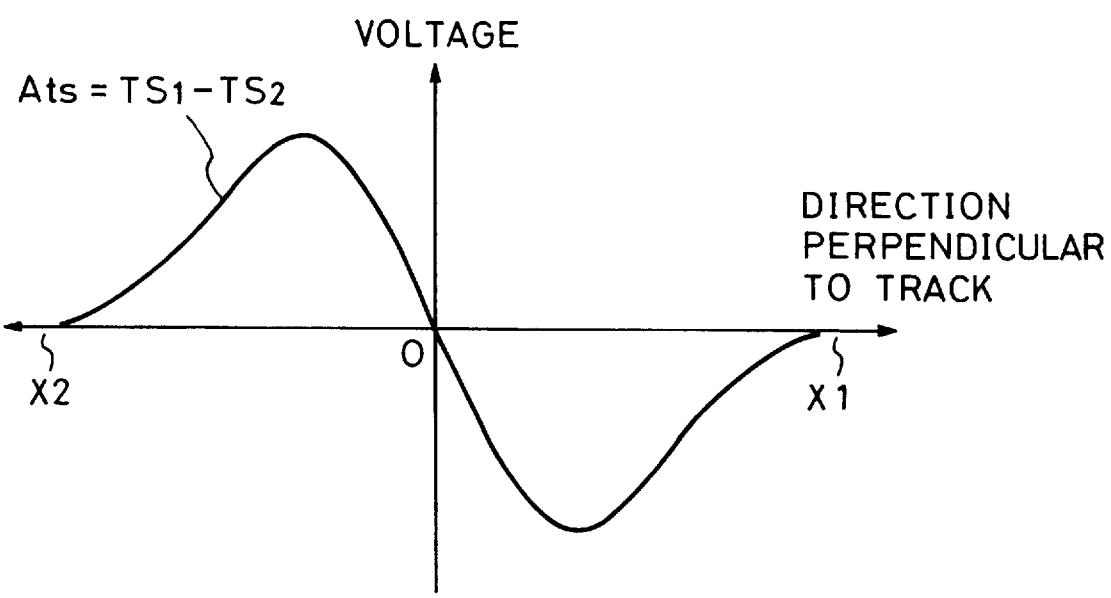
FIG. 6 is a graph showing the relationship between the amount of deviation of tracking control light spots and the voltage of a tracking error signal in the apparatus shown in FIG. 1.
Figure 19:
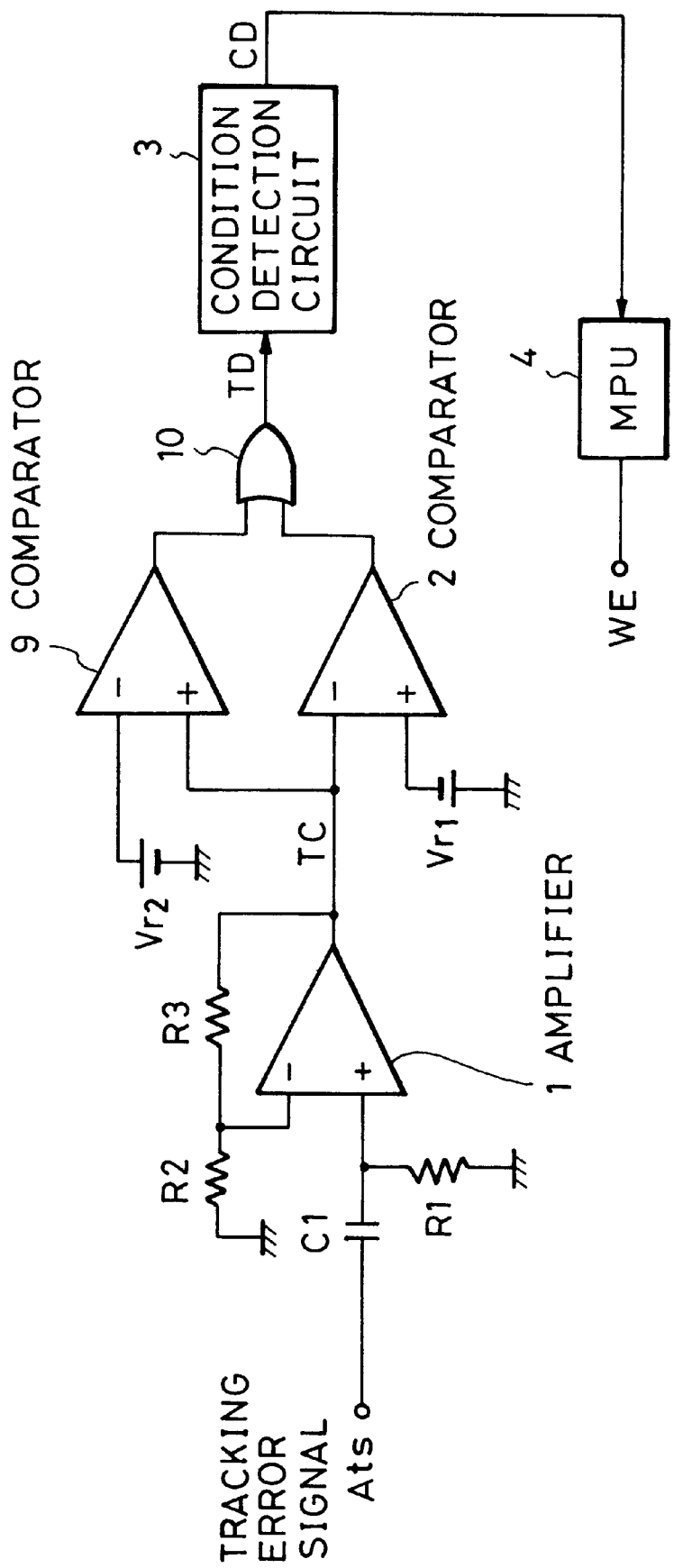
FIG. 19 is a circuit diagram of a third embodiment of the present invention.

FIG. 19 is a circuit diagram of the third embodiment of the present invention. The same reference numerals and letters as those used in FIG. 10 designate the same elements. In this embodiment, a tracking control disturbance is detected from the tracking error signal $A_{ts}$, while in the first and second embodiments a tracking control disturbance is detected from the received light signal $T_{s2}$. That is, the above-described embodiments are arranged to detect a pit signal component appearing in the received light signal $T_{s2}$ from the photosensor 116 shown in FIG. 4. However, such a pit signal component also appears in the tracking error signal $A_{ts}$. Also, the tracking error signal $A_{ts}$ becomes positive and negative according to the directions of deviation of the light spots, as shown in FIG. 5. Therefore, this embodiment is arranged to detect a tracking control disturbance by detecting a pit signal component in the tracking error signal, thereby preventing overwriting of recorded information. The embodiment shown in FIG. 19 can be used in common in the single and dual light source systems, because the intensity modulation of the recording light beam does not influence the tracking error signal.

Referring to FIG. 19, low-frequency components of the tracking error signal $A_{ts}$ are removed by a high-pass filter formed by a capacitor C1 and a resistor R1, and only high-frequency components are input to an amplifier 1. A signal output from the amplifier 1 is compared with a negative reference value $V_{r1}$ by a comparator 2 and with a positive reference value $V_{r2}$ by a comparator 9 to be converted into a two-value signal. That is, the tracking error signal $A_{ts}$. changes in plus and minus directions according to the direction of deviation and is therefore compared with the negative reference value $V_{r1}$ by the comparator 2 when a negative pit signal component appears therein and is compared with the positive reference value $V_{r2}$ by the comparator 9 when a positive pit signal component appears. Output signals from the comparators 2 and 9 are input into an OR circuit 10 and the result of a logical OR operation is output to a condition detection circuit 3. Except for these points, the configuration of this embodiment is the same as that of the embodiment shown in FIG. 10.

In the circuit shown in FIG. 19, in a case where tracking control is disturbed so that the light spots are shifted toward the information track T3, a negative pit signal component appears in the tracking error signal $A_{ts}$. In this case, high-frequency components appearing in the output from the amplifier 1 are two-valued by being compared with the reference value $V_{r1}$ in the comparator 2, and the two value signal thereby obtained is output to the condition detection circuit 3 through the OR circuit 10. The condition detection circuit 3 detects a tracking control disturbance on the basis of the two-valued signal, as in the case of the embodiment shown in FIG. 1, and the MPU 4 performs control of the apparatus to stop the information recording operation. On the other hand, in a case where information has already been recorded in the information track T1 and where tracking control is disturbed during scanning of the light spots on the information track T2 so that the light spots are shifted toward the information track T1, a positive pit signal component appears in the tracking error signal $A_{ts}$. Accordingly, in this case, the output from the amplifier 1 is two-valued by being compared with the reference value $V_{r2}$ in the comparator 9, and the condition detection circuit 3 detects a tracking control disturbance on the basis of the two-valued signal. If a tracking control disturbance is detected, the MPU 4 performs control of the apparatus to stop the information recording operation.

Thus, in this embodiment, a tracking control disturbance is detected from a pit signal component appearing in the tracking error signal. A tracking control disturbance can therefore be detected if the light spots are shifted to the left or right from the information track. Thus, tracking control disturbances can be detected regardless of the direction in which the light spots move, and it is therefore possible to prevent overwrite recording on information tracks to the left and right of a scanned information track with one circuit.

In the embodiment shown in FIG. 19, a tracking control disturbance is detected from the tracking error signal. However, it is also possible to detect a tracking control disturbance from the tracking sum signal in the same manner. That is, high-frequency components of the pit signal appear in the received light signals $T_{s1}$ and $T_{s2}$ from the photosensors 115 and 116 shown in FIG. 4, and, naturally, a pit signal component appears in a signal obtained by adding these light signals. The received light signals from the photosensors 115 and 116 shown in FIG. 4 are added to each other in the addition circuit 122 to form the tracking sum signal $A_{ta}$ and a tracking control disturbance can be detected on the basis of this signal. A fourth embodiment of the present invention will be described as an example of this method. However, when the light spots deviate to the left or right, the tracking sum signal $A_{ta}$ is at the tracking reflection level, as shown in FIG. 5, and does not change in the plus and minus directions according to the direction of deviation of the light spots as in the case of the tracking error signal.

More specifically, to detect a tracking control disturbance from the tracking sum signal in the dual light source system, the system may be arranged so that the tracking sum signal $A_{ta}$ is input to the circuit of the embodiment shown in FIG. 10 instead of the received light signal $T_{s2}$. If the tracking sum signal is input to the circuit of the embodiment shown in FIG. 10, a pit signal component appears in either case of shifting the light spots to the left or right. Therefore, it is possible to detect a tracking control disturbance regardless of the direction in which the light spots are shifted, as in the case of the embodiment shown in FIG. 19. If a tracking control disturbance is detected from the tracking sum signal, it is not necessary to use two comparators as in the arrangement shown in FIG. 19; rather, only one comparator may suffice. It is therefore possible to detect a tracking control disturbance with a simplest arrangement to prevent overwrite recording on information tracks other than the target track. With respect to the single light source system, the arrangement may be such that the tracking sum signal is input to the circuit of the embodiment shown in FIG. 18.

A fifth embodiment of the present invention will next be described. In the embodiment shown in FIG. 10, high-frequency components are detected from the received light signal from one of the two tracking control photosensors. If the positions of tracks in which information has been recorded and a track in which information is to be newly recorded are known, high-frequency components may be detected from one of the two received light signals as in the arrangement shown in FIG. 10. That is, referring to FIG. 9, in a case where information is recorded first on track T3, then on track T2, and then on track T1, a pit signal component appears first in the received light signal of reflected light of the light spot 228 (or 112) when the light spots are shifted toward the upper information track (track T3) in FIG. 9, and high-frequency components of the received light signal $T_{s2}$ of the corresponding photosensor may be detected. Conversely, in a case where information is recorded first on track T1, then on track T2, and then on track T3, high-frequency components of the received light signal $T_{s1}$ of the photosensor corresponding to the light spot 111 (or 227) may be detected. Further, the arrangement may be such that high-frequency components of both the received light signals $T_{s1}$ and $T_{s2}$ are detected and the recording operation is stopped when a high-frequency component appears in one of the two received light signals.

In such a case, a pair of circuits each consisting of the components from the high-pass filter to the condition detection circuit 3 in the arrangement shown in FIG. 10 may be provided and the MPU 4 may immediately stop the recording operation when a pit signal component is detected in one of the condition detection circuits 3. Thus, even if it is not known on which tracks information has been recorded or on which information is to be newly recorded, it is possible to reliably prevent overwrite recording by detecting high-frequency components of the two received light signals $T_{s1}$ and $T_{s2}$ and by stopping the recording operation if a pit signal component is detected from one of the received light signals.

Figure 20:
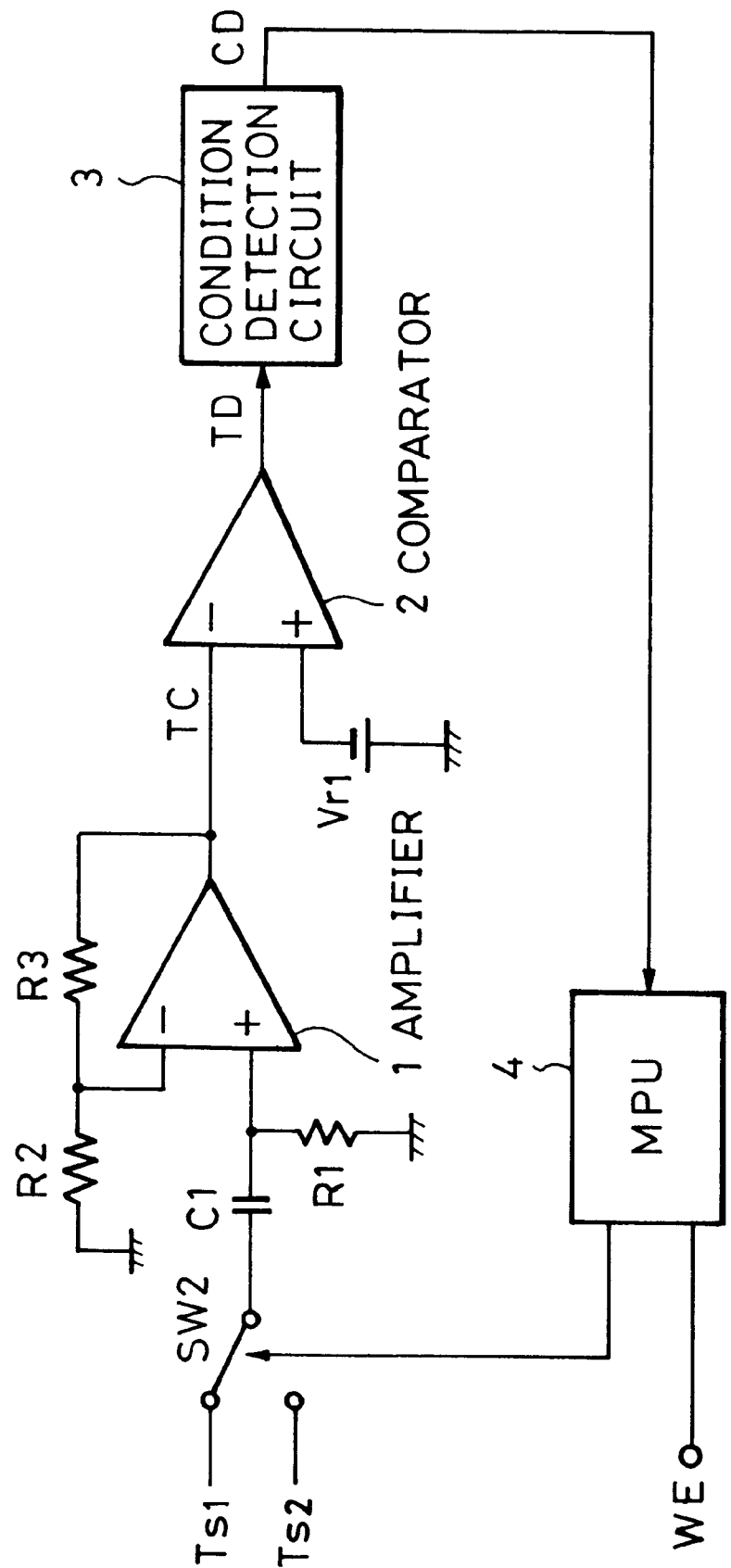
FIG. 20 is a circuit diagram of a sixth embodiment of the present invention.

In this example, however, such a pair of circuits is required and the circuit configuration is complicated. A sixth embodiment of the present invention, modified to use only the single circuit, will now be described with reference to circuit diagram of FIG. 20. The same reference numerals and letters as those used in FIG. 10 designate the same elements. The received light signals $T_{s1}$ and $T_{s2}$ from the photosensors 115 and 116 shown in FIG. 4 are input to a capacitor C1 of a high-pass filter, comprising capacitor C1 and resistor R1, through a switching device SW2. The switching device SW2 is switched between light signals $T_{s1}$ and $T_{s2}$ under the control of an MPU 4. By this switching, the received light signals $T_{s1}$ and $T_{s2}$ are alternatively input to the high-pass filter. Except for these points, the configuration is the same as that of the embodiment shown in FIG. 10. However, the example shown in FIG. 20 is adapted to the dual light source system. The timing of the switching of the switching device SW2 may be such that the switching device SW2 is switched at intervals of a scanning time corresponding to several pits to about 10 pits. Considering the speed at which tracking control is disturbed, it is suitable to use such changeover timing for the effect of preventing overwrite recording. Consequently, it is possible to reliably prevent overwrite recording by using a simple arrangement if the received light signals are changed by such predetermined timing. Needless to say, in the case of the single light source system, the arrangement may be such that a pair of circuits, each circuit consisting of the circuit shown in FIG. 18 are provided and the two received light signals are input by being changed in a time division manner by a switching device.

A seventh embodiment of the present invention will next be described. In the above-described embodiments, to prevent overwrite recording, a tracking control disturbance is detected by detecting some pit signal high-frequency components appearing in the received light signals $T_{s1}$ and $T_{s2}$ from the tracking control photosensors 115 and 116, the tracking error signal $A_{te}$ and the tracking sum signal $A_{ts}$. However, it is possible to fail to detect a tracking control disturbance by detection of these signals. For example, if the defect 224 on the information track T2 in FIG. 9 is so large as to extend even to the point X or Y, tracking control is largely disturbed when the light spots scan the defect 224, and the light spots move to a point Z when they passed the defect 224. In such a case, no pit signals appear in the above-mentioned three signals, and there is a possibility of the occurrence of overwrite recording immediately after the passage of the light spots over the defect 224.

Also, in a situation where one track is divided into plural sectors, where information has already been recorded in some of these sectors and where information is to be recorded in some sector in the same track other than the sectors containing already-recorded information, there is a possibility of overwrite recording when the light spots pass the sectors containing already-recorded information. Needless to say, such a case is not due to a tracking control disturbance, and overwrite recording is not prevented because no pit signal components appear in the above three signals. To solve this problem, overwrite recording may be prevented by detecting a pit signal component from the information reproduction signal RF shown in FIG. 4. More specifically, in the case of the dual light source system, the arrangement may be such that the information reproduction signal RF is input to the circuit of the embodiment shown in FIG. 10 instead of the received light signal $T_{s2}$, and control of the apparatus is performed so that the MPU 4 immediately stops the recording operation when the condition detection circuit 3 detects a pit signal component from the information reproduction signal RF. When a pit signal component appears in the information reproduction signal RF, overwrite recording has already been started. However, some data destroyed can be restored since error correction codes are included in ordinary information recording to enable an error to be corrected.

Figure 21:
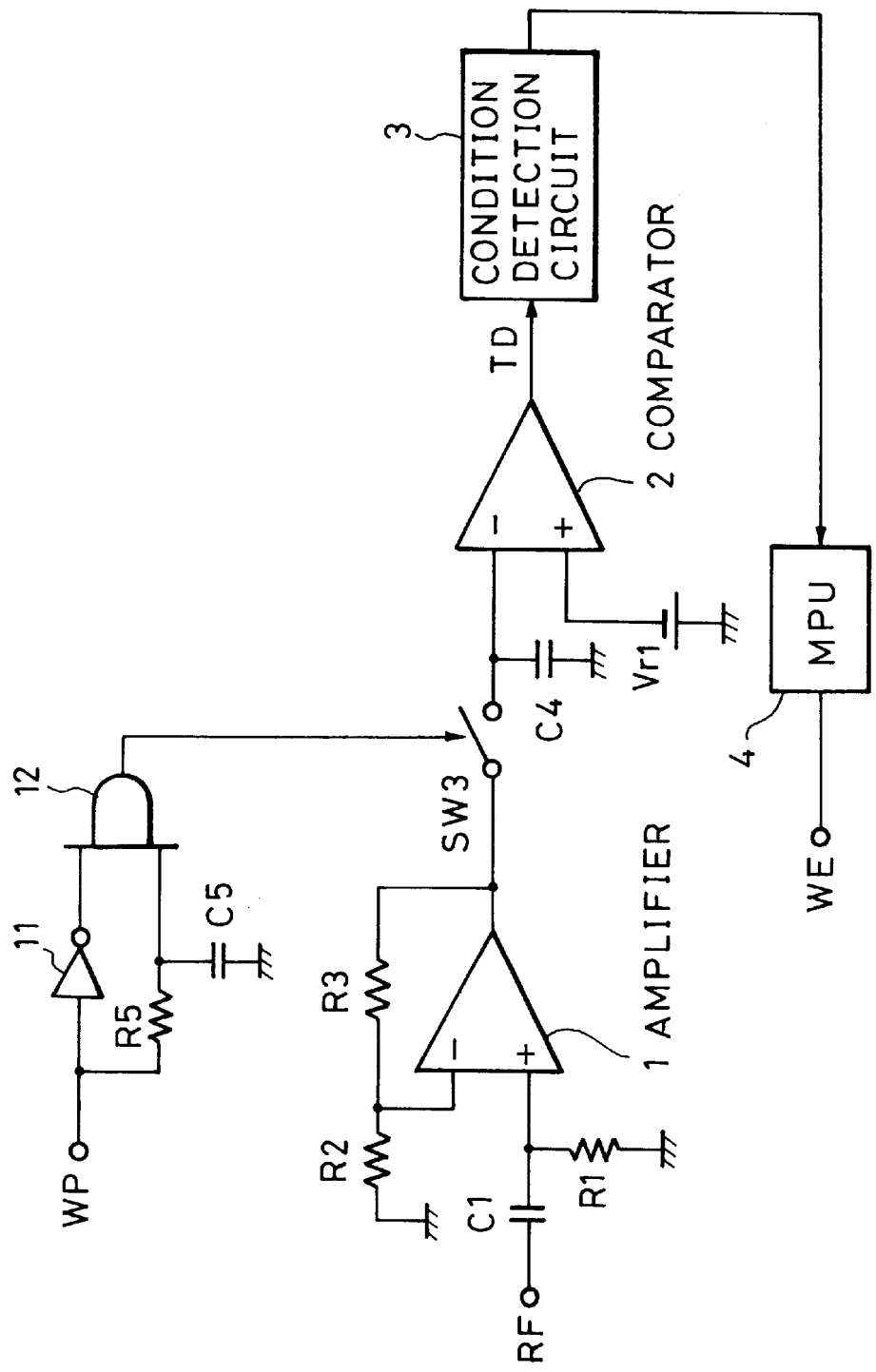
FIG. 21 is a circuit diagram of an eighth embodiment of the present invention.

In the case of the single light source system, it is necessary to separate the recording operation with respect to recording and reproduction since recording is performed by using the same light spot as that for obtaining the information reproduction signal RF. FIG. 21 is a circuit diagram of an eighth embodiment of the present invention applicable to the single light source system. The same reference numerals and letters as those used in FIG. 10 designate the same elements. In this embodiment, a sample and hold circuit for sampling and holding the information reproduction signal during time periods other than the periods of recording pulses WP is provided between an amplifier 1 and a comparator 2. The information reproduction signal RF is input to a capacitor C1 forming a high-pass filter with resistor R1. Except for these points, the configuration is the same as that of the embodiment shown in FIG. 10. The sample and hold circuit is formed by a switching device SW3 connected between the amplifier 1 and the comparator 2, a drive circuit for driving the switching device SW3 including an inverter 11 and an AND circuit 12, and a capacitor C4 for holding the output signal from the amplifier 1 when the switching device SW3 is turned on. The driving circuit also includes a delay circuit formed by a resistor R5 and a capacitor C5, the output of which is input into AND circuit 12.

The operation of this embodiment will be described below. A signal obtained by inverting recording pulses WP by the inverter 11 and a signal obtained by delaying recording pulses WP by the delay circuit formed by the resistor R5 and the capacitor C5 are input into the AND circuit 12 to form an output to the switching device SW3. The output signal from the AND circuit 12 is formed of a pulse signal having a width corresponding to a delay time of the delay circuit from the trailing end of each recording pulse WP, i.e., a time period other than the periods of recording pulses WP. The switching device SW3 is driven so as to be turned on to connect amplifier 1 to the comparator 2 during the period of this pulse signal. Accordingly, the output signal from the amplifier 1 is held by the capacitor C4 during time periods other than the periods of the recording pulses, i.e., when the intensity of the light spot is at a reproducing power level, thereby sampling and holding the information reproduction signal RF during the time periods other than the periods of the recording pulses WP. The signal held by the capacitor C4 is caused to be two-valued by the comparator 2 and pit signal high-frequency components are detected from the two-valued signal in a condition detection circuit 3, as in the case of the embodiment shown in FIG. 10. When a pit signal component is detected, an MPU performs control of the apparatus so as to stop the information recording operation.

As described above, the information reproduction signal RF is sampled and held when the recording pulses are supplied at the reproducing power level, thus making it possible to detect a pit signal component from the information reproduction signal RF even in the single light source system. It is therefore possible to prevent overwrite recording on tracks other than a target track or on sectors containing already-recorded information in a track containing a target sector in the single light source system in a case where there is a very large defect as described above. In this embodiment, no pit signal component can be detected if information newly recorded and information already recorded are entirely equal to each other. However, this is a rare case and it is usually possible to sufficiently detect components of the recorded pit signal from the information reproduction signal RF only by sampling and holding the information reproduction signal RF during the time periods other than the periods of the recording pulses WP.

As is apparent from the above description, for prevention of overwrite recording, it is necessary to detect pit signal components from a plurality of signals among the received light signals $T_{s1}$ and $T_{s2}$ from the photosensors 115 and 116, the tracking error signal $A_{ts}$, the tracking sum signal $A_{ta}$ and the information reproduction signal RF instead of detecting pit signal components from only one of these signals. For the desired effect, there are three possible combinations of these signals:

(1) a combination of received light signal $T_{s2}$ (or $T_{s1}$) and information reproduction signal RF, or a combination of received light signals $T_{s1}$ and $T_{s2}$ and information reproduction signal RF;

(2) a combination of tracking error signal $A_{ts}$ and information reproduction signal RF; and (3) a combination of tracking sum signal $A_{ta}$ and information reproduction signal RF.

With respect to the combination (1), in the case of the dual light source system, a pair of circuits each consisting of the components from the high-pass filter to the condition detection circuit 3 of the embodiment shown in FIG. 10 are provided, and received light signal $T_{s2}$ (or $T_{s1}$) and information reproduction signal RF are input to each circuit. If high-frequency components are detected from both received light signals $T_{s1}$ and $T_{s2}$, the same three circuits may be provided. The control of the apparatus may be such that the MPU 4 stops the recording operation if a pit signal component is detected in one of these circuits. The arrangement may alternatively be such that a single circuit formed of the embodiment shown in FIG. 10 is provided and received light signal $T_{s2}$ (or $T_{s1}$) or both $T_{s2}$ and $T_{s1}$ and information reproduction signal RF are input to this circuit by being switched in a time division manner by a switching device, an analog multiplexer or the like.

In the case of the single light source system, the arrangement may be such that a single unit or a pair of units of the circuit shown in FIG. 18 or a single unit of the circuit shown in FIG. 21 is provided and the recording operation is stopped if a pit signal component is detected in one of these circuits. If high-frequency components are detected from both received light signals $T_{s1}$ and $T_{s2}$, the arrangement may be such that a single unit of the circuit shown in FIG. 18 is provided and received light signals $T_{s1}$ and $T_{s2}$ are input by being switched in a time division manner.

With respect to the combination (2), in the case of the dual light source system, tracking error signal $A_{ts}$ is input to the circuit shown in FIG. 19 while the information reproduction signal is input to the circuit shown in FIG. 10. In the case of the single light source system, however, information reproduction signal RF is input to the circuit shown in FIG. 21. The recording operation is stopped if a pit signal component is detected in one of these circuits.

With respect to the combination (3), in the case of the dual light source system, a pair of circuits from the high-pass filter and the detection circuit 3 are provided and tracking sum signal $A_{ta}$ and information reproduction signal RF are input to each circuit. The arrangement may alternatively be such that a single unit of the circuit shown in FIG. 10 is provided and the tracking sum signal and the reproduction information signals are input by being switched in a time division manner. In the case of the single light source system, the tracking sum signal and the information reproduction signal RF may be input to the circuit shown in FIG. 10 and the circuit shown in FIG. 21, respectively. In each of the single and dual light source systems, the recording operation is stopped if a pit signal component is detected in one of these circuits.

Examples of the circuits with respect to these combinations have been described. In the case of any one of these combinations, it is possible to discriminate a pit signal component and a signal due to a medium defect from each other according to the conditions under which the signal CD appears. For example, in the case of the combination (1) in the dual light source system, if three units of the circuit shown in FIG. 10 are provided to input received light signal $T_{s1}$ or $T_{s2}$ and information reproduction signal RF, and if the signal CD are simultaneously output from both received light signal $T_{s1}$ or $T_{s2}$ and information reproduction signal RF, then it can be determined that these outputs are not obtained by detecting a pit signal component. Also, it is not actually possible that the CD signals are obtained simultaneously from both received light signals $T_{s1}$ and $T_{s2}$. If outputs are obtained in this manner, it can be determined that the result is not due to detection of a pit signal but due to a defect. In such a case, therefore, the MPU 4 may continue the recording operation by determining that the output condition is due to a medium defect.

As mentioned above, error correction codes are ordinarily added to recorded information and it is therefore possible to correct and restore a destroyed part of data. The circuit shown in FIG. 14 has been described as an example of means for preventing interruption of the signal CD. Such a means may be used in each of the above-described embodiments to perform a control of the apparatus in such a manner that the recording operation is stopped when the signal CD from the detection circuit 3 is sustained through a predetermined period of a correctable error length, thereby reducing the probability of an operation failure of the apparatus due to erroneous detection of medium defects. In the above-described embodiments, a pit signal component is detected during information recording to prevent overwrite recording. However, it is also possible to discriminate tracks containing recorded information by inputting information reproduction signal RF to the circuit shown in FIG. 10 or FIG. 12 at the time of information reproduction.

The embodiments of the present invention have been described as an apparatus using a three-beam system as a tracking control system. The present invention, however, can also be applied to apparatuses having other types of tracking systems. For example, there is a one-beam system in which one light spot irradiates one of tracking tracks tt1 to tt4 of the optical card shown in FIG. 2(a) and an image of the tracking track is obtained by one or two photosensors. In this one-beam system, signal components of recorded pits also appear in the received light signals from the photosensors, if tracking control is disturbed. Therefore, the present invention can also be applied to such a one-beam system as well as to the three-beam system. There is also another tracking control system in which one elongated light spot irradiates and extends from a center of a track to portions of adjacent tracking tracks. In this system, photosensors are also disposed at positions corresponding to the track center and the tracking tracks. Therefore, the present invention can also be applied to an apparatus using such a system as well as to three-beam type and one-beam type apparatuses.

In the apparatuses of the above-described embodiments, an optical card is used as an information recording medium. However, the present invention can also be applied to apparatuses using any medium other than the optical card, for example, an optical disk. In the described embodiment, a pit length recording method has been described as an example of the information recording method. Needless to say, the present invention is not limited to this recording method and can also be applied to apparatuses using any other recording method, e.g., a pit position recording method.

While the present invention has been described with respect to what is presently considered to be the preferred embodiments, it is to be understood that the invention is not limited to the disclosed embodiments. The present invention is intended to cover the various modifications and equivalent arrangements included within the spirit and scope of the appended claims.

What is claimed is:

1. An optical information recording apparatus for at least recording information by irradiating an optical information recording medium having a plurality of information tracks with a plurality of light beams, said apparatus comprising:

means for recording information on the recording medium with an information recording light beam;

a plurality of detecting elements for detecting reflected light of the light beams from the recording medium;

high-frequency component detection means for detecting a high-frequency component in a signal corresponding to an output signal from at least one of said plurality of detecting elements for detecting reflected light of a light beam other than the information recording light beam during intensity modulation of the information recording light beam based on the information;

control means for stopping the recording of information by said recording means when said high-frequency component detection means detects the high-frequency component;

means for generating at least three light beams one of which is the information recording light beam which said recording means projects onto the recording medium for recording information thereon, wherein the other two light beams are used for tracking control of the information recording light beam; and means for generating a tracking error signal on the basis of an output signal from at least one of said detecting elements detecting reflected light of the light beams for tracking control, wherein said high-frequency component detecting means detects the high-frequency component of the tracking error signal.

2. An apparatus according to claim 1, wherein the third of the at least three light beams is the information recording light beam, said apparatus further comprising tracking control means for performing tracking control of the information recording light beam using the two of the at least three beams for tracking control.

3. An apparatus according to claim 1, further comprising a single light source producing a single light beam and a beam splitter for splitting the single light beam into a plurality of light beams, one of which is the information recording light beam used by said recording means for recording information on the recording medium.

4. An apparatus according to claim 3, further comprising adjustment means for adjusting a change in the amplitude of the signal detected by said high-frequency component detection means according to intensity modulation of the information recording light beam.

5. An apparatus according to claim 1, wherein said high frequency component detection means comprises:

means for generating a window of a predetermined time period based on an edge of a binary signal corresponding to the output signal from the at least one of said plurality of said detecting elements; and means for detecting a change of the predetermined time period of a binary signal in the window.

6. An apparatus according to claim 1, wherein the high-frequency component is generated by the influence of a pit recorded in a track which is adjacent to the information track on which the information recording light beam is scanning.

7. An optical information recording apparatus for at least recording information by irradiating an optical information recording medium having a plurality of information tracks with a plurality of light beams, said apparatus comprising:

means for recording information on the recording medium with an information recording light beam;

a plurality of detecting elements for detecting reflected light of the light beams from the recording medium;

high-frequency component detection means for detecting a high-frequency component in a signal corresponding to an output signal from at least one of said plurality of detecting elements for detecting reflected light of a light beam other than the information recording light beam during intensity modulation of the information recording light beam based on the information;

control means for stopping the recording of information by said recording means when said high-frequency component detection means detects the high-frequency component; and means for reproducing information from the recording medium with an information reproducing light beam, and wherein said high-frequency component detection means detects the high-frequency component from a signal corresponding to an output signal from at least one of said detecting elements detecting reflected light of the information reproducing light beam;

a single light source emitting a single light beam;

means for splitting the single light beam into the information reproducing light beam and the information recording light beam; and means for sampling a signal corresponding to an output signal from at least one of said detecting elements detecting the information reproducing light beam according to the intensity modulation of the information recording light beam, wherein said high-frequency detection means detects a high-frequency component from the sampled signal.

8. An apparatus according to claim 7, wherein said high frequency component detecting means detects the high-frequency component from a signal corresponding to an output signal from a detection element for detecting reflected light of a light beam for reproducing the information, and wherein the light beam for reproducing is arranged at a position ahead of the information recording light beam in a direction of scanning of the information recording light beam.

9. An optical information recording apparatus for at least recording information by irradiating an optical information recording medium having a plurality of information tracks with a plurality of light beams, said apparatus comprising:

means for recording information on the recording medium with an information recording light beam;

a plurality of detecting elements for detecting reflected light of the light beams from the recording medium;

high-frequency component detection means for detecting a high-frequency component in a signal corresponding to an output signal from at least one of said plurality of detecting elements for detecting reflected light of a light beam other than the information recording light beam during intensity modulation of the information recording light beam based on the information;

control means for stopping the recording of information by said recording means when said high-frequency component detection means detects the high-frequency component;

wherein said recording means projects at least three light beams onto the recording medium, two of the at least three light beams being used for tracking control for the third of the at least three light beams, and wherein said high-frequency component detection means detects the high-frequency component from an output signal from at least one of said plurality of detecting elements detecting reflected light of the two of the at least three light beams for tracking control; and a first light source for emitting the two of the at least three light beams for tracking control and a second light source for emitting the third of the at least three light beams, the third of the at least three light beams being the information recording light beam.

* * * * *

UNITED STATES PATENT AND TRADEMARK OFFICE
CERTIFICATE OF CORRECTION

PATENT NO. : 5,909,414

DATED : June 1, 1999

INVENTOR(S): SHINICHI OHTA

It is certified that error appears in the above-identified patent and that said Letters Patent is hereby corrected as shown below:

COLUMN 1:
Line 55, "a" (1st occurrence) should be deleted.

COLUMN 6:
Line 64, "moves" should read -move-.

COLUMN 7:
Line 31, "area" should read -are-.

COLUMN 14:
Line 33, "is" should read -are-.

UNITED STATES PATENT AND TRADEMARK OFFICE
CERTIFICATE OF CORRECTION

PATENT NO. : 5,909,414

DATED : June 1, 1999

INVENTOR(S): SHINICHI OHTA

It is certified that error appears in the above-identified patent and that said Letters Patent is hereby corrected as shown below:

COLUMN 17:
Line 25, "two value" should read -two-value-.

Signed and Sealed this

Fifteenth Day of February, 2000

Q. TODD DICKINSON

*Attest:*

*Attesting Officer*    *Commissioner of Patents and Trademarks*